(12) United States Patent
Liberty

(10) Patent No.: US 9,208,488 B2
(45) Date of Patent: Dec. 8, 2015

(54) USING A MOBILE WALLET INFRASTRUCTURE TO SUPPORT MULTIPLE MOBILE WALLET PROVIDERS

(71) Applicant: MOZIDO, INC., Austin, TX (US)

(72) Inventor: Michael A. Liberty, Orlando, FL (US)

(73) Assignee: MOZIDO, INC., Austin, TX (US)

( * ) Notice: Subject to any disclaimer, the term of this patent is extended or adjusted under 35 U.S.C. 154(b) by 0 days.

(21) Appl. No.: 13/680,824

(22) Filed: Nov. 19, 2012

(65) Prior Publication Data

US 2013/0132219 A1      May 23, 2013

Related U.S. Application Data

(60) Provisional application No. 61/562,301, filed on Nov. 21, 2011.

(51) Int. Cl.
| | | |
|---|---|---|
| *G06Q 20/00* | (2012.01) |
| *G06G 1/12* | (2006.01) |
| *G06Q 20/36* | (2012.01) |
| *G06Q 20/20* | (2012.01) |
| *G06Q 20/06* | (2012.01) |

(52) U.S. Cl.
CPC ............. *G06Q 20/36* (2013.01); *G06Q 20/065* (2013.01); *G06Q 20/202* (2013.01)

(58) Field of Classification Search
None
See application file for complete search history.

(56) References Cited

U.S. PATENT DOCUMENTS

| | | |
|---|---|---|
| 5,717,374 A | 2/1998 | Smith |
| 5,828,739 A | 10/1998 | Nakanishi |
| 5,991,749 A | 11/1999 | Morrill, Jr. |
| 6,021,397 A | 2/2000 | Jones et al. |
| 6,175,823 B1 | 1/2001 | Van Dusen |
| 6,185,545 B1 | 2/2001 | Resnick et al. |

(Continued)

FOREIGN PATENT DOCUMENTS

| | | |
|---|---|---|
| AU | 2007312879 | 4/2008 |
| CA | 2666616 | 4/2008 |

(Continued)

OTHER PUBLICATIONS

International Search Report for PCT/US2012/066013 dated Jan. 29, 2013.

(Continued)

*Primary Examiner* — Paul Danneman
(74) *Attorney, Agent, or Firm* — Workman Nydegger

(57) ABSTRACT

Embodiments are directed to performing a transaction using a third party mobile wallet, performing a transaction using a third party point of sale (POS) system and to making a purchase from a third party mobile wallet provided by a third party mobile wallet provider. In one scenario, a cloud-based transaction platform is provided, which receives communication from an agent terminal over a communication channel connected to the cloud-based transaction platform. The agent communication indicates that a customer desires to perform a mobile wallet transaction using their third party mobile wallet. The cloud-based transaction platform sends the agent communication to a third party mobile wallet platform, receives communication from the third party mobile wallet platform confirming processing of the transaction, and sends communication to the agent terminal over a communication channel connected to the cloud-based transaction platform, where the communication indicates confirmation of the processing of the transaction.

22 Claims, 9 Drawing Sheets

(56) References Cited

U.S. PATENT DOCUMENTS

| | | |
|---|---|---|
| 6,250,557 B1 | 6/2001 | Forslund |
| 6,415,156 B1 | 7/2002 | Stadelmann |
| 6,622,015 B1 | 9/2003 | Himmel |
| 6,697,839 B2 | 2/2004 | Sini |
| 6,714,797 B1 | 3/2004 | Rautila |
| 6,736,322 B2 | 5/2004 | Gobburu |
| 6,819,219 B1 | 11/2004 | Bolle |
| 6,840,448 B2 | 1/2005 | Fukushima |
| 6,862,575 B1 | 3/2005 | Antilla et al. |
| 6,873,974 B1 | 3/2005 | Schutzer |
| 6,957,342 B2 | 10/2005 | Vantanen |
| 7,016,532 B2 | 3/2006 | Boncyk |
| 7,024,174 B2 | 4/2006 | Nagy et al. |
| 7,054,430 B2 | 5/2006 | Lynam |
| 7,069,001 B2 | 6/2006 | Rupp et al. |
| 7,089,208 B1 | 8/2006 | Levchin et al. |
| 7,099,850 B1 | 8/2006 | Mann, II et al. |
| 7,100,821 B2 | 9/2006 | Rasti |
| 7,107,247 B2 | 9/2006 | Kinoshita et al. |
| 7,110,972 B1 | 9/2006 | Handa et al. |
| 7,221,939 B2 | 5/2007 | Ylitalo |
| 7,240,836 B2 | 7/2007 | Vrotsos et al. |
| 7,248,855 B2 | 7/2007 | Joyce et al. |
| 7,255,264 B2 | 8/2007 | De Leon |
| 7,275,685 B2 | 10/2007 | Gray et al. |
| 7,322,043 B2 | 1/2008 | Letsinger |
| 7,325,132 B2 | 1/2008 | Takayama |
| 7,334,720 B2 | 2/2008 | Hulst et al. |
| 7,347,361 B2 | 3/2008 | Lovett |
| 7,349,871 B2 | 3/2008 | Labrou et al. |
| 7,353,382 B2 | 4/2008 | Labrou et al. |
| 7,363,261 B2 | 4/2008 | Whitehead, Jr. et al. |
| 7,403,652 B2 | 7/2008 | Boncyk |
| 7,461,010 B2 | 12/2008 | Kwan |
| 7,461,028 B2 | 12/2008 | Wronski, Jr. |
| 7,477,780 B2 | 1/2009 | Boncyk |
| 7,494,055 B2 | 2/2009 | Fernandes et al. |
| 7,512,098 B2 | 3/2009 | Jiang |
| 7,527,194 B2 | 5/2009 | Truitt |
| 7,548,915 B2 | 6/2009 | Ramer |
| 7,562,818 B1 | 7/2009 | Bierbaum |
| 7,564,469 B2 | 7/2009 | Cohen |
| 7,565,008 B2 | 7/2009 | Boncyk |
| 7,606,560 B2 | 10/2009 | Labrou |
| 7,657,489 B2 | 2/2010 | Stambaugh |
| 7,677,973 B2 | 3/2010 | Van Luchene |
| 7,680,324 B2 | 3/2010 | Boncyk |
| 7,689,506 B2 | 3/2010 | Fei et al. |
| 7,694,876 B2 | 4/2010 | Barnes et al. |
| 7,699,218 B2 | 4/2010 | Garcia et al. |
| 7,708,194 B2 | 5/2010 | Vawter |
| 7,729,963 B1 | 6/2010 | Lego et al. |
| 7,729,987 B1 | 6/2010 | Wakim et al. |
| 7,748,618 B2 | 7/2010 | Vawter |
| 7,774,076 B2 | 8/2010 | Skowronek |
| 7,774,231 B2 | 8/2010 | Pond et al. |
| 7,775,437 B2 | 8/2010 | Cohen |
| 7,784,684 B2 | 8/2010 | Labrou et al. |
| 7,801,826 B2 | 9/2010 | Labrou et al. |
| 7,819,307 B2 | 10/2010 | Lyons |
| 7,822,688 B2 | 10/2010 | Labrou |
| 7,823,772 B2 | 11/2010 | Vawter |
| 7,848,500 B2 | 12/2010 | Lynam |
| 7,848,504 B2 | 12/2010 | Lynam |
| 7,865,414 B2 | 1/2011 | Fung et al. |
| 7,865,431 B2 | 1/2011 | Takayama |
| 7,877,605 B2 | 1/2011 | Labrou et al. |
| 7,881,529 B2 | 2/2011 | Boncyk |
| 7,886,962 B2 | 2/2011 | Vawter |
| 7,890,424 B1 | 2/2011 | Wakim et al. |
| 7,899,243 B2 | 3/2011 | Boncyk |
| 7,899,252 B2 | 3/2011 | Boncyk |
| 7,937,302 B1 | 5/2011 | Lego et al. |
| 7,937,305 B1 | 5/2011 | Lego et al. |
| 7,942,317 B2 | 5/2011 | Racz et al. |
| 7,958,052 B2 | 6/2011 | Powell |
| 7,967,196 B1 | 6/2011 | Bierbaum |
| 7,979,026 B2 | 7/2011 | Hulvey |
| 7,988,060 B2 | 8/2011 | Killian et al. |
| 8,016,185 B2 | 9/2011 | Modi |
| 8,019,365 B2 | 9/2011 | Fisher |
| 8,033,458 B2 | 10/2011 | Hulst et al. |
| 8,041,338 B2 | 10/2011 | Chen |
| 8,052,042 B2 | 11/2011 | Kolinski-Schultz et al. |
| 8,060,012 B2 | 11/2011 | Sklovsky |
| 8,061,598 B2 | 11/2011 | Racz et al. |
| 8,073,783 B2 | 12/2011 | Felsted et al. |
| 8,077,042 B2 | 12/2011 | Peeters |
| 8,090,945 B2 | 1/2012 | Singhal |
| 8,095,113 B2 | 1/2012 | Kean |
| 8,116,734 B2 | 2/2012 | Vawter |
| 8,116,773 B2 | 2/2012 | Chitrapu |
| 8,118,221 B2 | 2/2012 | Racz et al. |
| 8,121,945 B2 | 2/2012 | Rackley |
| 8,130,242 B2 | 3/2012 | Cohen |
| 8,145,568 B2 | 3/2012 | Rackley |
| 8,160,959 B2 | 4/2012 | Rackley |
| 8,170,485 B2 | 5/2012 | Hulvey |
| 8,190,087 B2 | 5/2012 | Fisher |
| 8,195,576 B1 | 6/2012 | Grigg |
| 8,196,131 B1 | 6/2012 | von Behren |
| 8,213,470 B2 | 7/2012 | Gu et al. |
| 8,218,873 B2 | 7/2012 | Boncyk |
| 8,229,354 B2 | 7/2012 | Sklovsky |
| 8,239,325 B2 | 8/2012 | Schwarz |
| 8,275,312 B2 | 9/2012 | Fisher |
| 8,290,433 B2 | 10/2012 | Fisher |
| 8,332,272 B2 | 12/2012 | Fisher |
| 8,333,319 B2 | 12/2012 | Roth |
| 8,336,772 B2 | 12/2012 | Racz et al. |
| 8,352,323 B2 | 1/2013 | Fisher |
| 8,355,670 B2 | 1/2013 | White |
| 8,359,265 B2 | 1/2013 | Van Rensburg |
| 8,360,329 B2 | 1/2013 | Grigg |
| 8,374,916 B2 | 2/2013 | White |
| 8,380,177 B2 | 2/2013 | Laracey |
| 8,396,793 B2 | 3/2013 | Hill |
| 8,487,771 B2 | 7/2013 | Hsieh et al. |
| 8,577,803 B2 | 11/2013 | Chatterjee et al. |
| 8,612,325 B2 | 11/2013 | Laracey |
| 8,632,000 B2 | 1/2014 | Laracey |
| 2001/0011248 A1 | 8/2001 | Himmel |
| 2001/0037264 A1 | 11/2001 | Husemann |
| 2001/0042785 A1 | 11/2001 | Walker et al. |
| 2002/0042776 A1 | 4/2002 | Woo et al. |
| 2002/0052754 A1 | 5/2002 | Joyce et al. |
| 2002/0060246 A1 | 5/2002 | Gobburu |
| 2002/0065774 A1 | 5/2002 | Young et al. |
| 2002/0069123 A1 | 6/2002 | Soderlind et al. |
| 2002/0131404 A1 | 9/2002 | Mehta et al. |
| 2002/0141586 A1 | 10/2002 | Margalit |
| 2002/0152177 A1 | 10/2002 | Wolf |
| 2002/0161708 A1 | 10/2002 | Offer |
| 2003/0001010 A1 | 1/2003 | Schmidt et al. |
| 2003/0055735 A1 | 3/2003 | Cameron |
| 2003/0071115 A1 | 4/2003 | Horn et al. |
| 2003/0154165 A1 | 8/2003 | Horn et al. |
| 2003/0195842 A1 | 10/2003 | Reece |
| 2004/0117302 A1 | 6/2004 | Weichert et al. |
| 2004/0181531 A1 | 9/2004 | Becker |
| 2004/0205618 A1 | 10/2004 | Sini |
| 2004/0235450 A1 | 11/2004 | Rosenberg |
| 2004/0248554 A1 | 12/2004 | Khan et al. |
| 2005/0070265 A1 | 3/2005 | Korpinen |
| 2005/0080697 A1 | 4/2005 | Foss, Jr. et al. |
| 2005/0187873 A1 | 8/2005 | Labrou |
| 2005/0199709 A1 | 9/2005 | Linlor |
| 2005/0222961 A1 | 10/2005 | Staib |
| 2006/0116892 A1 | 6/2006 | Grimes |
| 2006/0136901 A1 | 6/2006 | Nichols |
| 2006/0165060 A1 | 7/2006 | Dua |
| 2006/0179452 A1 | 8/2006 | Amodeo et al. |
| 2006/0200427 A1 | 9/2006 | Morrison et al. |
| 2006/0253335 A1 | 11/2006 | Keena et al. |

(56) References Cited

U.S. PATENT DOCUMENTS

| | | |
|---|---|---|
| 2006/0287004 A1 | 12/2006 | Fuqua |
| 2007/0033285 A1 | 2/2007 | Shiigi |
| 2007/0106564 A1 | 5/2007 | Matotek et al. |
| 2007/0123305 A1 | 5/2007 | Chen |
| 2007/0125838 A1 | 6/2007 | Law et al. |
| 2007/0125840 A1 | 6/2007 | Law et al. |
| 2007/0162471 A1 | 7/2007 | Samuelsson |
| 2007/0179885 A1 | 8/2007 | Bird et al. |
| 2007/0198432 A1 | 8/2007 | Pitroda |
| 2007/0203850 A1 | 8/2007 | Singh et al. |
| 2007/0241189 A1 | 10/2007 | Slavin |
| 2007/0244811 A1 | 10/2007 | Tumminaro |
| 2007/0255620 A1 | 11/2007 | Tumminaro et al. |
| 2007/0255652 A1 | 11/2007 | Tumminaro et al. |
| 2007/0255653 A1 | 11/2007 | Tumminaro et al. |
| 2007/0265984 A1 | 11/2007 | Santhana |
| 2008/0006685 A1 | 1/2008 | Rackley |
| 2008/0010191 A1 | 1/2008 | Rackley |
| 2008/0010196 A1 | 1/2008 | Rackley |
| 2008/0010204 A1 | 1/2008 | Rackley |
| 2008/0010215 A1 | 1/2008 | Rackley |
| 2008/0011825 A1 | 1/2008 | Giordano et al. |
| 2008/0017704 A1 | 1/2008 | VanDeburg et al. |
| 2008/0040265 A1 | 2/2008 | Rackley |
| 2008/0040285 A1 | 2/2008 | Wankmueller |
| 2008/0052192 A1 | 2/2008 | Fisher |
| 2008/0065490 A1 | 3/2008 | Novick et al. |
| 2008/0097851 A1 | 4/2008 | Bemmel |
| 2008/0126145 A1 | 5/2008 | Rackley |
| 2008/0126929 A1 | 5/2008 | Bykov |
| 2008/0143487 A1 | 6/2008 | Hulvey |
| 2008/0197190 A1 | 8/2008 | Fujita |
| 2008/0204358 A1 | 8/2008 | Sato |
| 2008/0208743 A1 | 8/2008 | Arthur et al. |
| 2008/0208744 A1 | 8/2008 | Arthur et al. |
| 2008/0208762 A1 | 8/2008 | Arthur et al. |
| 2008/0210751 A1 | 9/2008 | Kim |
| 2008/0249927 A1 | 10/2008 | Rethorn |
| 2008/0249928 A1 | 10/2008 | Hill et al. |
| 2008/0249930 A1 | 10/2008 | Hill |
| 2008/0249933 A1 | 10/2008 | Rethorn |
| 2008/0255947 A1 | 10/2008 | Friedman |
| 2008/0275779 A1 | 11/2008 | Lakshminarayanan |
| 2008/0281737 A1 | 11/2008 | Fajardo |
| 2009/0037326 A1 | 2/2009 | Chitti |
| 2009/0055322 A1 | 2/2009 | Bykov |
| 2009/0063312 A1 | 3/2009 | Hurst |
| 2009/0081989 A1 | 3/2009 | Wuhrer |
| 2009/0098854 A1 | 4/2009 | Park |
| 2009/0104888 A1 | 4/2009 | Cox |
| 2009/0106148 A1 | 4/2009 | Prada |
| 2009/0108015 A1 | 4/2009 | Kreamer |
| 2009/0119190 A1 | 5/2009 | Realini |
| 2009/0132362 A1 | 5/2009 | Fisher |
| 2009/0132392 A1 | 5/2009 | Davis |
| 2009/0138366 A1 | 5/2009 | Bemmel et al. |
| 2009/0144161 A1 | 6/2009 | Fisher |
| 2009/0156190 A1 | 6/2009 | Fisher |
| 2009/0157546 A1 | 6/2009 | Garcia et al. |
| 2009/0177578 A1 | 7/2009 | Garcia et al. |
| 2009/0177581 A1 | 7/2009 | Garcia et al. |
| 2009/0210308 A1 | 8/2009 | Toomer |
| 2009/0222353 A1 | 9/2009 | Guest et al. |
| 2009/0222358 A1 | 9/2009 | Bednarek |
| 2009/0234751 A1 | 9/2009 | Chan et al. |
| 2009/0248537 A1 | 10/2009 | Sarkeshik |
| 2009/0254440 A1 | 10/2009 | Pharris |
| 2009/0254479 A1 | 10/2009 | Pharris |
| 2009/0265272 A1 | 10/2009 | Dill et al. |
| 2009/0281904 A1 | 11/2009 | Pharris |
| 2009/0288012 A1 | 11/2009 | Hertel |
| 2009/0299844 A1 | 12/2009 | Reilly |
| 2009/0307132 A1 | 12/2009 | Phillips |
| 2010/0010964 A1 | 1/2010 | Skowronek |
| 2010/0023449 A1 | 1/2010 | Skowronek |
| 2010/0030651 A1 | 2/2010 | Matotek et al. |
| 2010/0044430 A1 | 2/2010 | Song et al. |
| 2010/0048226 A1 | 2/2010 | Owen |
| 2010/0049599 A1 | 2/2010 | Owen |
| 2010/0051685 A1 | 3/2010 | Royyuru |
| 2010/0057614 A1 | 3/2010 | Rainey |
| 2010/0057619 A1 | 3/2010 | Weller et al. |
| 2010/0057624 A1 | 3/2010 | Hurt |
| 2010/0063895 A1 | 3/2010 | Dominguez et al. |
| 2010/0088188 A1 | 4/2010 | Kumar |
| 2010/0125495 A1 | 5/2010 | Smith |
| 2010/0125510 A1 | 5/2010 | Smith |
| 2010/0151790 A1 | 6/2010 | Hoeksel et al. |
| 2010/0197326 A1 | 8/2010 | Ngo |
| 2010/0223110 A1 | 9/2010 | Slavin |
| 2010/0235283 A1 | 9/2010 | Gerson |
| 2010/0248710 A1 | 9/2010 | Sklovsky |
| 2010/0250356 A1 | 9/2010 | Gillenson |
| 2010/0250436 A1 | 9/2010 | Loevenguth |
| 2010/0260388 A1 | 10/2010 | Garrett |
| 2010/0333129 A1 | 12/2010 | Alhadeff et al. |
| 2011/0047016 A1 | 2/2011 | Cook |
| 2011/0057025 A1 | 3/2011 | Denzer |
| 2011/0087529 A1 | 4/2011 | Angell |
| 2011/0087610 A1 | 4/2011 | Batada |
| 2011/0105022 A1 | 5/2011 | Vawter |
| 2011/0113473 A1 | 5/2011 | Corda |
| 2011/0145049 A1 | 6/2011 | Hertel |
| 2011/0145149 A1 | 6/2011 | Valdes |
| 2011/0179113 A1 | 7/2011 | Thomas |
| 2011/0196788 A1 | 8/2011 | Lu et al. |
| 2011/0218911 A1 | 9/2011 | Spodak |
| 2011/0246284 A1 | 10/2011 | Chaikin |
| 2011/0250866 A1 | 10/2011 | Fisher |
| 2011/0251941 A1 | 10/2011 | Dunwoody |
| 2011/0258024 A1 | 10/2011 | Prince |
| 2011/0258115 A1 | 10/2011 | Mulhim |
| 2011/0276417 A1 | 11/2011 | Campbell |
| 2011/0295750 A1 | 12/2011 | Rammal |
| 2011/0302016 A1 | 12/2011 | Haddad |
| 2011/0302406 A1 | 12/2011 | Machani |
| 2011/0313924 A1 | 12/2011 | Carell et al. |
| 2011/0320243 A1 | 12/2011 | Khan |
| 2011/0320293 A1 | 12/2011 | Khan |
| 2011/0320294 A1 | 12/2011 | Votaw |
| 2011/0320345 A1 | 12/2011 | Taveau |
| 2012/0005076 A1 | 1/2012 | Dessert |
| 2012/0011058 A1 | 1/2012 | Pitroda et al. |
| 2012/0011063 A1 | 1/2012 | Killian |
| 2012/0028612 A1 | 2/2012 | Hurst |
| 2012/0029990 A1 | 2/2012 | Fisher |
| 2012/0047070 A1 | 2/2012 | Pharris |
| 2012/0074232 A1 | 3/2012 | Spodak |
| 2012/0078735 A1 | 3/2012 | Bauer |
| 2012/0079521 A1 | 3/2012 | Garg et al. |
| 2012/0084203 A1 | 4/2012 | Mehew |
| 2012/0095855 A1 | 4/2012 | Sterling |
| 2012/0095856 A1 | 4/2012 | Sanjeev |
| 2012/0122447 A1 | 5/2012 | Craft |
| 2012/0123841 A1 | 5/2012 | Taveau |
| 2012/0123868 A1 | 5/2012 | Brudnicki |
| 2012/0123880 A1 | 5/2012 | Craft |
| 2012/0123935 A1 | 5/2012 | Brudnicki |
| 2012/0123937 A1 | 5/2012 | Spodak |
| 2012/0143752 A1 | 6/2012 | Wong |
| 2012/0150669 A1 | 6/2012 | Langley |
| 2012/0158589 A1 | 6/2012 | Katzin |
| 2012/0171992 A1 | 7/2012 | Cheong |
| 2012/0172026 A1 | 7/2012 | Kwon |
| 2012/0172089 A1 | 7/2012 | Bae |
| 2012/0174189 A1 | 7/2012 | Lim |
| 2012/0191557 A1 | 7/2012 | Fisher |
| 2012/0191612 A1 | 7/2012 | Spodak |
| 2012/0196586 A1 | 8/2012 | Grigg |
| 2012/0197691 A1 | 8/2012 | Grigg |
| 2012/0197740 A1 | 8/2012 | Grigg |
| 2012/0197743 A1 | 8/2012 | Grigg |
| 2012/0197745 A1 | 8/2012 | Fisher |
| 2012/0197787 A1 | 8/2012 | Grigg |

(56) References Cited

U.S. PATENT DOCUMENTS

| | | |
|---|---|---|
| 2012/0203610 A1 | 8/2012 | Grigg et al. |
| 2012/0203632 A1 | 8/2012 | Blum |
| 2012/0209688 A1 | 8/2012 | Lamothe |
| 2012/0209749 A1 | 8/2012 | Hammad |
| 2012/0215701 A1 | 8/2012 | Mehta |
| 2012/0221421 A1 | 8/2012 | Hammad |
| 2012/0221475 A1 | 8/2012 | Grigg |
| 2012/0226610 A1 | 9/2012 | Gill |
| 2012/0229647 A1 | 9/2012 | Calman |
| 2012/0229657 A1 | 9/2012 | Calman |
| 2012/0231424 A1 | 9/2012 | Calman |
| 2012/0231425 A1 | 9/2012 | Calman |
| 2012/0232937 A1 | 9/2012 | Calman |
| 2012/0232977 A1 | 9/2012 | Calman |
| 2012/0232983 A1 | 9/2012 | Bertha |
| 2012/0245986 A1 | 9/2012 | Regan et al. |
| 2012/0253852 A1 | 10/2012 | Pourfallah |
| 2012/0259686 A1 | 10/2012 | Yurrow |
| 2012/0259698 A1 | 10/2012 | Yurrow |
| 2012/0259732 A1 | 10/2012 | Sasankan |
| 2012/0265677 A1 | 10/2012 | Rackley |
| 2012/0265685 A1 | 10/2012 | Brudnicki |
| 2012/0271712 A1 | 10/2012 | Katzin |
| 2012/0284131 A1 | 11/2012 | Soffer |
| 2012/0286928 A1 | 11/2012 | Mullen |
| 2012/0290376 A1 | 11/2012 | Dryer |
| 2012/0290449 A1 | 11/2012 | Mullen |
| 2012/0290478 A1* | 11/2012 | Crofts ............... G06Q 20/322 705/44 |
| 2012/0293303 A1 | 11/2012 | Khan |
| 2012/0296708 A1 | 11/2012 | Bachmann |
| 2012/0296720 A1 | 11/2012 | Pirillo |
| 2012/0296722 A1 | 11/2012 | Gosavi |
| 2012/0296741 A1 | 11/2012 | Dykes |
| 2012/0297204 A1 | 11/2012 | Buer |
| 2012/0302204 A1 | 11/2012 | Gupta |
| 2012/0303425 A1 | 11/2012 | Katzin |
| 2012/0310720 A1 | 12/2012 | Balsan |
| 2012/0310760 A1 | 12/2012 | Phillips |
| 2012/0310824 A1 | 12/2012 | Liberty |
| 2012/0310826 A1 | 12/2012 | Chatterjee |
| 2012/0316950 A1 | 12/2012 | LaPorte |
| 2012/0316951 A1 | 12/2012 | Fisher |
| 2012/0316992 A1 | 12/2012 | Oborne |
| 2012/0317019 A1 | 12/2012 | Carnes |
| 2012/0323653 A1 | 12/2012 | Fisher |
| 2012/0323664 A1 | 12/2012 | Klems |
| 2012/0323670 A1 | 12/2012 | Fisher |
| 2012/0323777 A1 | 12/2012 | Liberty |
| 2012/0329394 A1 | 12/2012 | Fisher |
| 2012/0330737 A1 | 12/2012 | Liberty |
| 2012/0330792 A1 | 12/2012 | Kashanian |
| 2013/0012125 A1 | 1/2013 | Fisher |
| 2013/0012126 A1 | 1/2013 | Fisher |
| 2013/0012131 A1 | 1/2013 | Fisher |
| 2013/0013352 A1 | 1/2013 | Fisher |
| 2013/0013353 A1 | 1/2013 | Fisher |
| 2013/0013355 A1 | 1/2013 | Fisher |
| 2013/0013432 A1 | 1/2013 | Fisher |
| 2013/0013434 A1 | 1/2013 | Fisher |
| 2013/0013490 A1 | 1/2013 | Keller |
| 2013/0013498 A1 | 1/2013 | Fisher |
| 2013/0013499 A1 | 1/2013 | Kalgi |
| 2013/0013501 A1 | 1/2013 | Rackley |
| 2013/0017784 A1 | 1/2013 | Fisher |
| 2013/0018738 A1 | 1/2013 | Faires |
| 2013/0018740 A1 | 1/2013 | Fisher |
| 2013/0018742 A1 | 1/2013 | Fisher |
| 2013/0018793 A1 | 1/2013 | Wong |
| 2013/0023209 A1 | 1/2013 | Fisher |
| 2013/0023294 A1 | 1/2013 | Singh |
| 2013/0024220 A1 | 1/2013 | Fisher |
| 2013/0024221 A1 | 1/2013 | Fisher |
| 2013/0024223 A1 | 1/2013 | Thomas |
| 2013/0024280 A1 | 1/2013 | Fisher |
| 2013/0024364 A1 | 1/2013 | Shrivastava et al. |
| 2013/0024371 A1 | 1/2013 | Hariramani |
| 2013/0024372 A1 | 1/2013 | Spodak |
| 2013/0024377 A1 | 1/2013 | Stong |
| 2013/0029646 A1 | 1/2013 | Chowdhury |
| 2013/0030828 A1 | 1/2013 | Pourfallah |
| 2013/0030960 A1 | 1/2013 | Kashanian |
| 2013/0030997 A1 | 1/2013 | Spodak |
| 2013/0035035 A1 | 2/2013 | Fisher |
| 2013/0035036 A1 | 2/2013 | Fisher |
| 2013/0035037 A1 | 2/2013 | Fisher |
| 2013/0035068 A1 | 2/2013 | Fisher |
| 2013/0035069 A1 | 2/2013 | Fisher |
| 2013/0035070 A1 | 2/2013 | Fisher |
| 2013/0035071 A1 | 2/2013 | Fisher |
| 2013/0035072 A1 | 2/2013 | Fisher |
| 2013/0035087 A1 | 2/2013 | Fisher |
| 2013/0035967 A1 | 2/2013 | Fisher |
| 2013/0035968 A1 | 2/2013 | Fisher |
| 2013/0035969 A1 | 2/2013 | Fisher |
| 2013/0035970 A1 | 2/2013 | Fisher |
| 2013/0040568 A1 | 2/2013 | Fisher |
| 2013/0040569 A1 | 2/2013 | Fisher |
| 2013/0041699 A1 | 2/2013 | Fisher |
| 2013/0041700 A1 | 2/2013 | Fisher |
| 2013/0041701 A1 | 2/2013 | Roth |
| 2013/0041736 A1 | 2/2013 | Coppinger |
| 2013/0041743 A1 | 2/2013 | Coppinger |
| 2013/0041744 A1 | 2/2013 | Coppinger |
| 2013/0041745 A1 | 2/2013 | Coppinger |
| 2013/0041769 A1 | 2/2013 | Fisher |
| 2013/0046608 A1 | 2/2013 | Coppinger |
| 2013/0046634 A1 | 2/2013 | Grigg |
| 2013/0046645 A1 | 2/2013 | Grigg |
| 2013/0048723 A1 | 2/2013 | King |
| 2013/0052952 A1 | 2/2013 | Fisher |
| 2013/0054336 A1 | 2/2013 | Graylin |
| 2013/0054337 A1 | 2/2013 | Brendell |
| 2013/0054412 A1 | 2/2013 | Brendell |
| 2013/0054441 A1 | 2/2013 | Kamdar |
| 2013/0057392 A1 | 3/2013 | Bullock |
| 2013/0060618 A1 | 3/2013 | Barton |
| 2013/0073373 A1 | 3/2013 | Fisher |
| 2013/0073458 A1 | 3/2013 | Sherwin |
| 2013/0080228 A1 | 3/2013 | Fisher |
| 2013/0080229 A1 | 3/2013 | Fisher |
| 2013/0080230 A1 | 3/2013 | Fisher |
| 2013/0080231 A1 | 3/2013 | Fisher |
| 2013/0080232 A1 | 3/2013 | Fisher |
| 2013/0080233 A1 | 3/2013 | Fisher |
| 2013/0080240 A1 | 3/2013 | Fisher |
| 2013/0080241 A1 | 3/2013 | Fisher |
| 2013/0080329 A1 | 3/2013 | Royyuru |
| 2013/0091012 A1 | 4/2013 | Liberty |
| 2013/0238455 A1 | 9/2013 | Laracey |
| 2013/0246141 A1 | 9/2013 | Liberty |
| 2013/0246203 A1 | 9/2013 | Laracey |
| 2013/0317928 A1 | 11/2013 | Laracey |
| 2013/0332347 A1 | 12/2013 | Liberty |
| 2014/0006048 A1 | 1/2014 | Liberty |
| 2014/0201070 A1 | 7/2014 | Liberty |

FOREIGN PATENT DOCUMENTS

| | | |
|---|---|---|
| CN | 101606400 | 12/2009 |
| CN | 102073958 | 5/2011 |
| DE | 10119808 | 9/2002 |
| EP | 1280115 | 1/2003 |
| EP | 2084921 | 4/2008 |
| JP | 2001297198 | 10/2001 |
| JP | 2001357164 | 12/2001 |
| JP | 2002-99716 | 4/2002 |
| KR | 10-2002-0065989 | 8/2002 |
| KR | 10-2003-0068603 | 8/2003 |
| KR | 10-2007-0092400 | 9/2007 |
| WO | 9834203 | 8/1998 |
| WO | 9913636 | 3/1999 |
| WO | 0171627 | 9/2001 |
| WO | 0197118 | 12/2001 |

(56) References Cited

FOREIGN PATENT DOCUMENTS

| WO | 02071354 | 9/2002 |
|---|---|---|
| WO | 03012717 | 2/2003 |
| WO | 2004010393 | 1/2004 |
| WO | 2004023353 | 3/2004 |
| WO | 2004053640 | 6/2004 |
| WO | 2004088641 | 10/2004 |
| WO | 2005079254 | 9/2005 |
| WO | 2005086593 | 9/2005 |
| WO | 2007145500 | 12/2007 |
| WO | 2008008735 | 1/2008 |
| WO | 2012025824 | 3/2012 |
| WO | WO 2013009444 | 1/2013 |
| WO | WO 2013009446 | 1/2013 |
| WO | WO 2013025273 | 2/2013 |
| WO | WO 2013078176 | 5/2013 |
| WO | WO 2013166174 | 7/2013 |

OTHER PUBLICATIONS

Written Opinion for PCT/US2012/066013 dated Jan. 29, 2013.
Chen, Jiajun Jim et al. Short-range Wireless Technologies with Mobile Payments Systems. Proceedings of the 6th international conference on Electronic commerce [Online] 2004, pp. 649-656.
Labrou, Yannis et al. Wireless Wallet. Proceedings of the First Annual International Conference on Mobile and Ubiquitous Systems: Networking and Services [Online] 2004, pp. 1-10.
Motorola, Motorola M-Wallet Solution. [Online] 2006 http://www.motorola.com/networkoperators/pdfs/M-Wallet-Brochure.pdf (accessed Oct. 4, 2012).
Valcourt, E. et al., "Investigating Mobile Payment", Wireless and Mobile Computing, Networking and Communications, 2005. (WiMob'2005), IEEE International Conference on Aug. 22-24, 2005, vol. 4, pp. 29-36 vol. 4.
Gao, Jerry, et al., "P2P-Paid: A Peer-to-Peer Wireless Payment System", Proceedings of the 2005 Second IEEE International Workshop on Mobile Commerce and Services (WMCS'05) Jul. 2005, 10 pages.
Edwin, et al., "Technobiography", Oct. 2004, 29 pages.
U.S. Appl. No. 13/527,466, Dec. 4, 2013, Final Office Action.
U.S. Appl. No. 13/964,707, Feb. 24, 2014, Office Action.
International Search Report for PCT/US2012/040131 Dated Jan. 29, 2013.
Written Opinion for PCT/US2012/040131 dated Jan. 29, 2013.
U.S. Appl. No. 13/527,466, Apr. 15, 2013, Office Action.
U.S. Appl. No. 13/484,199, Jun. 7, 2013, Notice of Allowance.
U.S. Appl. No. 14/213,543, May 6, 2014, Office Action.
U.S. Appl. No. 14/341,605, filed Jul. 25, 2014, Liberty, Michael A.
European Search Report for EP12824344 dated Sep. 29, 2014.
Sykes, et al. "Securing Mobile Banking," Credit Union Management, Novemer 2010, vol. 33 No. 11; ISSN 0273-9267.
Clarke, Irvine III, "Emerging Value Propositions for M-commerce," *Journal of Business Strategies*, vol. 25, Issue 2, Fall 2008, p. 41-57; ISSN: 0887-2058.
Wei, et al., "Development of a Web-Based Mobile Airline Ticketing Model with Usability Features," 2005, Industrial Management + Data Systems; vol. 105 No. 9, ISSN: 0263-5577.
International Search Report and Written Opinion for PCT/US2012/43458 dated Aug. 17, 2012.
U.S. Appl. No. 13/528,720, Jun. 25, 2014, Office Action.
U.S. Appl. No. 13/964,707, Jul. 10, 2014, Office Action.
U.S. Appl. No. 13/527,466, Aug. 1, 2014, Office Action.
U.S. Appl. No. 13/528,720, Dec. 10, 2014, Final Office Action.
Liberty, Michael A., International Search Report for PCT/US2012/043321 dated Sep. 6, 2012.
Liberty, Michael A., International Search Report for PCT/US2012/058849 dated Jan. 4, 2013.
Liberty, Michael A., Written Opinion for PCT/US2012/043321 dated Sep. 6, 2012.
Liberty, Michael A., Written Opinion for PCT/US2012/058849 dated Jan. 4, 2013.
International Search Report for PCT/US2013/039100 dated Aug. 23, 2013.
Written Opinion for PCT/US2013/039100 dated Aug. 23, 2013.
U.S. Appl. No. 14/012,822, Jan. 7, 2015, Final Office Action.
U.S. Appl. No. 14/012,822, Aug. 7, 2014, Office Action.
U.S. Appl. No. 13/964,707, Mar. 16, 2015, Final Office Action.
U.S. Appl. No. 14/213,543, Apr. 8, 2015, Office Action.
U.S. Appl. No. 13/874,192, Jul. 14, 2015, Office Action.
U.S. Appl. No. 13/527,466, Jul. 16, 2015, Office Action.
U.S. Appl. No. 13/528,720, Jul. 22, 2015, Office Action.

\* cited by examiner

Subscriber Makes Retail Purchase

USING A MOBILE WALLET INFRASTRUCTURE TO SUPPORT MULTIPLE MOBILE WALLET PROVIDERS

CROSS-REFERENCE TO RELATED APPLICATIONS

This application claims priority to and the benefit of U.S. Provisional Application Ser. No. 61/562,301, entitled "Using a Mobile Wallet Infrastructure to Support Multiple Mobile Wallet Providers", filed on Nov. 21, 2011, which is herein incorporated by reference in its entirety.

BACKGROUND

Mobile phones and other digital devices have become increasingly popular in recent years. Many mobile device users use their devices to perform countless different daily tasks. For instance, mobile devices allow users to check email, send and receive instant messages, check calendar items, take notes, set up reminders, browse the internet, play games or perform any number of different things using specialized applications or "apps". These applications allow mobile devices to communicate with other computer systems and perform a wide variety of network-connected tasks previously not possible with a mobile device.

BRIEF SUMMARY

Embodiments described herein extend to methods, systems, and computer program products for a cloud-based transaction platform. Embodiments include an infrastructure that can be used with third party mobile wallets provided by third party mobile wallet providers. Users with native or third party mobile wallets can use the cloud-based transaction platform to enroll a customer for a third party mobile wallet, add a stored value account (either hosted by the cloud-based transaction platform or a third party), add a bank/credit union account to a third party mobile wallet, add a debit/credit card account to a third party mobile wallet, deposit funds in a third party mobile wallet, withdraw funds from a third party mobile wallet, pay bills from a third party mobile wallet, top up a prepaid mobile account through a third party mobile wallet, transfer funds through a third party mobile wallet, and make in store purchases from a third party mobile wallet.

Embodiments described herein are directed to performing a transaction using a third party mobile wallet, performing a transaction using a third party point of sale (POS) system and to making a purchase from a third party mobile wallet provided by a third party mobile wallet provider. In one embodiment, a cloud-based transaction platform is provided, which receives communication from an agent terminal over a communication channel connected to the cloud-based transaction platform. The agent communication indicates that a customer desires to perform a mobile wallet transaction using their third party mobile wallet. The cloud-based transaction platform sends the agent communication to a third party mobile wallet platform, receives communication from the third party mobile wallet platform confirming processing of the transaction, and sends communication to the agent terminal over a communication channel connected to the cloud-based transaction platform, where the communication indicates confirmation of the processing of the transaction.

In another embodiment, a cloud-based transaction platform performs a transaction using a third party point of sale (POS) system. The cloud-based transaction platform receives communication from a specified POS system implemented at an agent terminal over a communication channel connected to the cloud-based transaction platform. The POS communication indicates that a customer has initiated a mobile wallet transaction using their third party mobile wallet. The cloud-based transaction platform sends the POS communication to a corresponding third party POS transaction processing system that has been established to process POS transactions from the specified POS system, receives communication from the third party POS transaction processing system confirming processing of the transaction, and sends communication to the specified POS system implemented at the agent terminal over a communication channel connected to the cloud-based transaction platform, where the communication indicates confirmation of the processing of the transaction.

In yet another embodiment, a cloud-based transaction platform is provided which allows users to make purchases from a third party mobile wallet provided by a third party mobile wallet provider. The cloud-based transaction platform receives communication from a customer over a communication channel connected to the cloud-based transaction platform. The customer communication indicates that a customer desires to purchase an item for a specified amount of funds using a specified payment method indicated by the customer's third party mobile wallet. The cloud-based transaction platform returns a secure, perishable purchase code to the customer over at least one the communication channels connected to the cloud-based transaction platform and receives communication from an agent terminal over a communication channel connected to the cloud-based transaction platform. The agent terminal communication indicates that the purchase code has been presented to an agent. The cloud-based transaction platform then debits the customer's third party mobile wallet by the specified amount of funds to complete the purchase.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
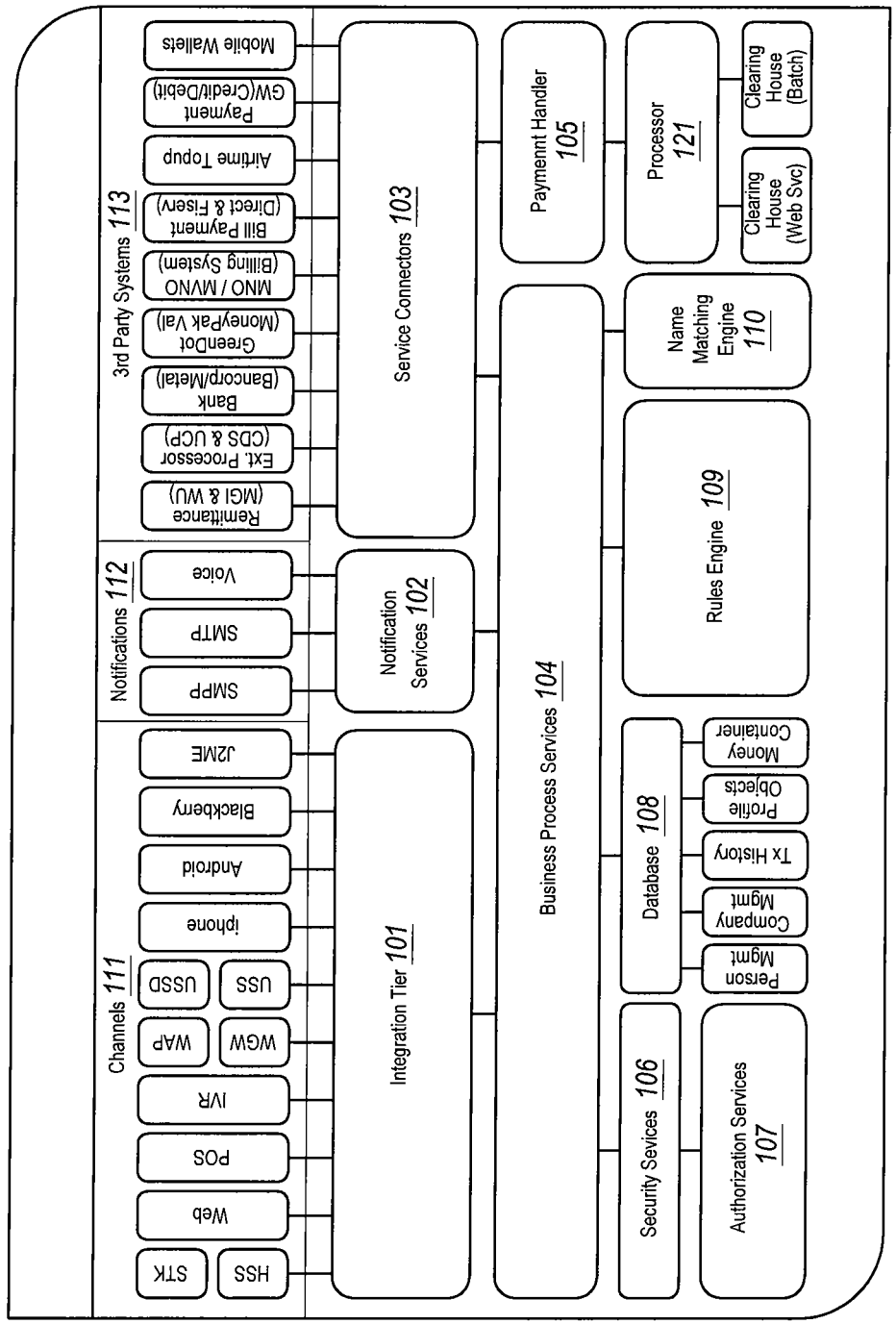
FIG. 1 illustrates a monetary transaction system architecture in which embodiments described herein may operate.

Embodiments described herein extend to methods, systems, and computer program products for a cloud-based transaction platform. Embodiments include an infrastructure that can be used with third party mobile wallets provided by third party mobile wallet providers. Users with native or third party mobile wallets can use the cloud-based transaction platform to enroll a customer for a third party mobile wallet, add a stored value account (either hosted by the cloud-based transaction platform or a third party), add a bank/credit union account to a third party mobile wallet, add a debit/credit card account to a third party mobile wallet, deposit funds in a third party mobile wallet, withdraw funds from a third party mobile wallet, pay bills from a third party mobile wallet, top up a prepaid mobile account through a third party mobile wallet, transfer funds through a third party mobile wallet, and make in store purchases from a third party mobile wallet.

Embodiments described herein are directed to performing a transaction using a third party mobile wallet, performing a transaction using a third party point of sale (POS) system and to making a purchase from a third party mobile wallet provided by a third party mobile wallet provider. In one embodiment, a cloud-based transaction platform is provided, which receives communication from an agent terminal over a communication channel connected to the cloud-based transaction platform. The agent communication indicates that a customer desires to perform a mobile wallet transaction using their third party mobile wallet. The cloud-based transaction platform sends the agent communication to a third party mobile wallet platform, receives communication from the third party mobile wallet platform confirming processing of the transaction, and sends communication to the agent terminal over a communication channel connected to the cloud-based transaction platform, where the communication indicates confirmation of the processing of the transaction.

In another embodiment, a cloud-based transaction platform performs a transaction using a third party point of sale (POS) system. The cloud-based transaction platform receives communication from a specified POS system implemented at an agent terminal over a communication channel connected to the cloud-based transaction platform. The POS communication indicates that a customer has initiated a mobile wallet transaction using their third party mobile wallet. The cloud-based transaction platform sends the POS communication to a corresponding third party POS transaction processing system that has been established to process POS transactions from the specified POS system, receives communication from the third party POS transaction processing system confirming processing of the transaction, and sends communication to the specified POS system implemented at the agent terminal over a communication channel connected to the cloud-based transaction platform, where the communication indicates confirmation of the processing of the transaction.

In yet another embodiment, a cloud-based transaction platform is provided which allows users to make purchases from a third party mobile wallet provided by a third party mobile wallet provider. The cloud-based transaction platform receives communication from a customer over a communication channel connected to the cloud-based transaction platform. The customer communication indicates that a customer desires to purchase an item for a specified amount of funds using a specified payment method indicated by the customer's third party mobile wallet. The cloud-based transaction platform returns a secure, perishable purchase code to the customer over at least one the communication channels connected to the cloud-based transaction platform and receives communication from an agent terminal over a communication channel connected to the cloud-based transaction platform. The agent terminal communication indicates that the purchase code has been presented to an agent. The cloud-based transaction platform then debits the customer's third party mobile wallet by the specified amount of funds to complete the purchase. Such purchases may be for items that are provided by the cloud-based transaction platform, either directly or via a third-party provider. These items may include music, movies, games and other downloadable content, physical items that can be shipped to the user and other items such as health care services.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Various terminology will be used herein to describe the cloud-based transaction platform (also referred to as a "monetary transaction system", "mobile wallet platform", "mobile wallet program", "mobile wallet transaction system", "mobile financial services (mFS) platform" or "electronic payment system"). The term "agent" is used to refer to an individual with mFS transaction system tools and training to support specific mFS functions. These mFS functions include subscriber registration and activation, and the deposit and withdrawal of funds from the mFS transaction system. Agents are representatives of the mFS transaction system or "program". Agents can be employees or contractors of the program provider, or other companies and organizations that partner with the program provider to provide these services themselves. Agents may be found in every facet of a typical economy, and may include large retailers, mobile network operators (MNO) airtime sales agents, gas stations, kiosks, or other places of business.

The cloud-based transaction platform includes an infrastructure that allows native mobile wallet application and third party mobile wallet applications to interact both with the transaction system and with each other. This allows the user of a native or a third party mobile wallet to make purchases, transfer money or perform any of the other transactions described herein. The cloud-based transaction platform may include a mobile wallet application and a web interface or some other type of functionality that allows the user to interact with the cloud-based transaction platform using their mobile device. The native and third party mobile wallet applications may include a subscriber identity module (SIM) application, an Unstructured Supplementary Service Data (USSD) application, a smartphone application, a web application, a mobile web application, a Wireless Application Protocol (WAP) application, a Java 2 Platform, Micro Edition (J2ME) application, a tablet application or any other type of application or interface that provides tools for the agent to register, activate, and offer other services to the mFS subscriber.

As used herein, a mobile wallet application is a mobile wallet application installed on a SIM card or elsewhere on a mobile device. The mobile wallet application may either be native (i.e. provided by the provider of the cloud-based transaction platform) or third party (i.e. provided by a provider other than the provider of the cloud-based transaction platform).

A USSD application is an application that implements USSD for various functionality including prepaid callback service, location-based content services, menu-based information services and other mobile wallet platform services. A web application is one that implements or uses the internet to provide mobile wallet platform functionality. A mobile web application is similar to a web application, but is tailored for mobile devices. A WAP application is one that uses the wireless application protocol to communicate with the mobile wallet platform to provide the platform's functionality. A J2ME application is an application developed in Java and is designed to provide mobile wallet functionality on a variety of different hardware. A tablet application is an application specifically designed for a touchscreen-based tablet that provides mobile wallet platform functionality for tablet devices. Any of these applications (or any combination thereof) may be provided on the user's mobile device. This functionality can also be made available on a retail point of sale (POS) system or web site. Indeed, the cloud-based transaction platform allows different POS systems to interact with each other and conduct transactions between themselves.

The term "agent administrator" refers to an individual with mFS program tools and training to administrate the allocation of funds to agent branches (e.g. retail locations). As agents perform mFS transactions with subscribers, such as depositing and withdrawing money, the agents are adding and removing money from their own accounts. Any of the applications referred to above may be configured to provide tools used by the agent administrator to view the agent company balance, view the agent branch balances, and transfer funds into and out of agent branch mobile wallets. This functionality can also be made available on a website for easier access.

In some embodiments, the mFS platform application may utilize triple data encryption standard (3DES) encryption (or some other type of encryption), encrypted message signing, and password security on some or all of its communications with the mFS transaction system in order to ensure that the transactions are properly secured and authenticated.

The term "agent branch" refers to any location where an agent provides support for subscriber services of the mFS platform. Funds are allocated by the agent administrator from the agent company's main account to each agent branch to fund the subscriber mFS functions such as depositing or withdrawing cash, in-store purchases, bill payments, prepaid airtime top-ups and money transfers. In some cases, multiple agents may work in a single branch. However, at least in some cases, monetary funds are allocated to from the agent company's main account on a per branch basis.

The term "agent branch account balance" refers to the amount of money residing in a particular agent branch account at a given time. Funds can be deposited into the branch account by the agent administrator, or the funds can come from participating in subscriber mFS transactions such as depositing or withdrawing cash from the subscriber's mobile wallet accounts, or making retail purchases with the mobile wallet.

In some embodiments, in countries with more developed economies, it may be beneficial to use program-issued prepaid debit cards, pre-paid access accounts, stored value accounts or gift cards to conduct business along with the added convenience of card processing networks such as Cirrus, STAR, or Visa for POS and automated teller machine (ATM) functionality. Agents, particularly those in retail outlets and kiosks, can still support subscribers with deposits, withdrawals, and other transfers, but in this case bank external card processors manage the mobile wallet and branch account balances and provide the real-time transfer of funds.

The term "agent branch ledger" refers to a written (or electronic) ledger maintained by the mFS platform. Agent branch transactions are performed on the agent's and subscriber's mobile phones where an electronic record of the transaction is generated and stored on the mFS platform. These electronic transactions are then reconciled with agent branch ledgers to ensure the security and integrity of the transaction. Agent branch ledgers are printed or electronic transaction logs that are distributed to the agent branch locations in hard copy form to serve as a backup record to the electronic transactions.

The term "agent company" refers to a business that registers to participate in the mFS program as a partner of the mFS program provider or owner. The agent company has one or more agent branches which conduct mFS business with mFS program subscribers. In some cases, the agent company may be referred to as a distributor or retailer.

The term "agent company account balance" refers to the sum of the funds deposited at a "partner bank" (defined below) by the agent company to fund the agent company's daily transactions. The funds in the agent company account are then distributed to agent branches by the agent company's agent administrator to conduct everyday business such as accepting cash deposits and cash withdrawals from mFS subscribers. This balance is sometimes referred to as the "agent company float".

An "agent manager" is a supervisor of company agents for a given company. The agent manager has the training and tools to create, delete or modify agent accounts for a company, as well as monitor the transactions performed by agents. The agent manager may have a special application or an increased level of rights to access applications features not available to other users. The special application is a program installed on the agent manager's terminal. This application provides the agent manager the ability to securely perform agent manager functions such as registering and activating new agent accounts. The mFS agent manager application may be installed on any terminal or device. It communicates with the mFS platform using binary and/or text SMS messages. A wireless service provider or MNO provides the GSM SMS network infrastructure on which the mFS platform operates.

As subscribers, agents, and other mFS program participants conduct business in the mFS program, value is transferred from one account to the next as payment for services rendered or goods purchased. This value can be in the form of real currency or the electronic representation referred to herein as eMoney. Among other situations, eMoney is used in mFS implementations where the real-time processing of financial transactions including card processing is not practical. The mFS platform utilizes an internal transaction processor for managing the real-time balance of mobile wallet and agent accounts as value (eMoney) is transferred from one mobile wallet to another in payment for services.

The term "mFS program master account" refers to a bank account maintained by the mFS program partner bank to provide funds and float for the operation of the mFS platform. Depending on the type of mFS implementation, the master account can include sub-accounts for each of the agent branches and subscriber mobile wallets, giving the bank visibility into all transactions on a per-user basis. The mFS platform can also manage the balance of sub-accounts and interact with the bank's master account when funds need to be deposited or withdrawn from the account.

The term mobile network operator (MNO) refers to a provider of mobile phone service including basic voice, SMS, unstructured supplementary service data (USSD) and data service, and may also be referred to as a "wireless service provider".

The term "mobile wallet" or "mobile wallet account" refers to a stored value account or prepaid access account (PPA) that allows the owner (or "subscriber") to pay for goods and services on the mFS platform from his or her mobile wallet account. When the mFS eMoney transaction processor is used, the mobile wallet balance is maintained by the mFS platform and value is exchanged within the mFS program as eMoney. When the mFS platform is integrated to an external card processor, the mobile wallet utilizes funds from the subscriber's prepaid debit card and bank account to exchange value on the mFS platform.

The term "partner bank" refers to the primary bank participating in the mFS program. The partner bank is responsible for holding the mFS program master accounts that hold the funds for all mFS services and transactions. A "PIN" refers to a numeric password that may be required to perform a transaction via the mobile wallet application.

The term "subscriber" refers to a participant of the mFS mobile wallet platform. The subscriber maintains a mobile wallet balance and performs transactions using the mFS application. An "unbanked subscriber" is a subscriber that does not have (or does not have access to) a bank account or credit union account. The application or "mobile wallet application" provides mobile wallet functionality to the (unbanked) subscriber. The mobile wallet application is installed on a mobile device in the device's memory, on a SIM card (such as a GSM SIM card) or is otherwise accessible to the mobile device. The mobile wallet application provides the subscriber the ability to securely perform subscriber functions such as making retail purchases, paying bills, or transferring money to other mFS subscribers and non-subscribers. The mobile wallet application communicates with the mFS platform using binary and text SMS messages, among other forms of wireless communication. A wireless service provider or MNO provides the GSM network infrastructure on which the mFS platform operates.

FIG. 1 illustrates an example system architecture for a cloud-based transaction platform. Integration tier 101 is configured to manage mobile wallet sessions and maintain integrity of financial transactions. Integration tier 101 can also include a communication (e.g., Web services) API and/or other communication mechanisms to accept messages from channels 111. Other mechanisms include, but are not limited to: International Standards Organization ("ISO") 8583 for Point of Sale ("POS") and Automated Teller Machines ("ATM") devices and Advanced Message Queuing Protocol ("AMQP") for queue based interfaces. Each of channels 111 can be integrated to one or more mechanisms for sending messages to integration tier 101. Notification services 102 is configured to send various notifications through different notification channels 112, such as, for example, Short Message Peer-to-Peer ("SSMP") for Short Messaging Service ("SMS") and Simple Mail Transfer Protocol ("SMTP") for emails. Notification services 102 can be configured through a web services API.

Service connectors 103 are a set of connectors configure to connect to 3rd party systems 113. Each connector can be a separate module intended to integrate an external service to the system architecture. Business process services 104 are configured to implement business workflows, including executing financial transactions, auditing financial transactions, invoking third-party services, handling errors, and logging platform objects. Payment handler 105 is configured to wrap APIs of different payment processors, such as, for example, banking accounts, credit/debit cards or processor 121. Payment handler 105 exposes a common API to facilitate interactions with many different kinds of payment processors.

Security services 106 are configured to perform subscriber authentication. Authorization services 107 are configured to perform client authorization, such as, for example, using a database-based Access Control List ("ACL") table.

Database 108 is configured to manage customer accounts (e.g., storing customer accounts and properties), manage company accounts (e.g., storing company accounts and properties), manage transaction histories (e.g., storing financial transaction details), store customer profiles, storing dictionaries used by the mobile wallet platform, such as, for example, countries, currencies, etc., and managing money containers. Rules engine 109 is configured to gather financial transaction statistics and uses the statistics to provide transaction properties, such as, for example, fees and bonuses. Rules engine 109 is also configured to enforce business constraints, such as, for example, transactions and platform license constraints.

Name matching engine 110 is configured to match different objects according to specified configuration rules. Matching engine 110 can be used to find similarities between names, addresses, etc. Transaction processor 121 is configured to manage financial accounts and transactions. The transaction processor 121 can be used to hold, load, withdraw and deposit funds to mobile wallet accounts. Transaction processor 121 can also be used as a common interface to a third party processor system. When used as a common interface, financial operations may be delegated to the external processor. A Clearing House subsystem of transaction processor 121 can be used to exchange the financial information with a bank.

Components of a mobile wallet platform can be connected to one another over (or be part of) a system bus and/or a network. Networks can include a Local Area Network ("LAN"), a Wide Area Network ("WAN"), and even the Internet. Accordingly, components of the mobile wallet platform can be "in the cloud". As such, mobile wallet platform components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the system bus and/or network.

The components depicted in FIG. 1 can interoperate to provide a number of financial and other services including but not limited to enrolling a customer for a mobile wallet, adding a stored value account (either hosted by a mobile wallet platform or a third party), adding a bank or credit union account to a third party mobile wallet, adding a debit or credit card account to a third party mobile wallet, depositing funds in a third party mobile wallet, withdrawing funds from a third party mobile wallet, paying bills from a third party mobile wallet, topping up a prepaid mobile account through a third party mobile wallet, transferring funds through a third party mobile wallet (nationally or internationally), making in-store purchases using a third party mobile wallet, selecting health care providers and paying for health care services, paying for music, games, movies or other downloadable provided by a third party provider and made available over the cloud-based transaction system, and various other tasks as described herein below.

Figure 2:
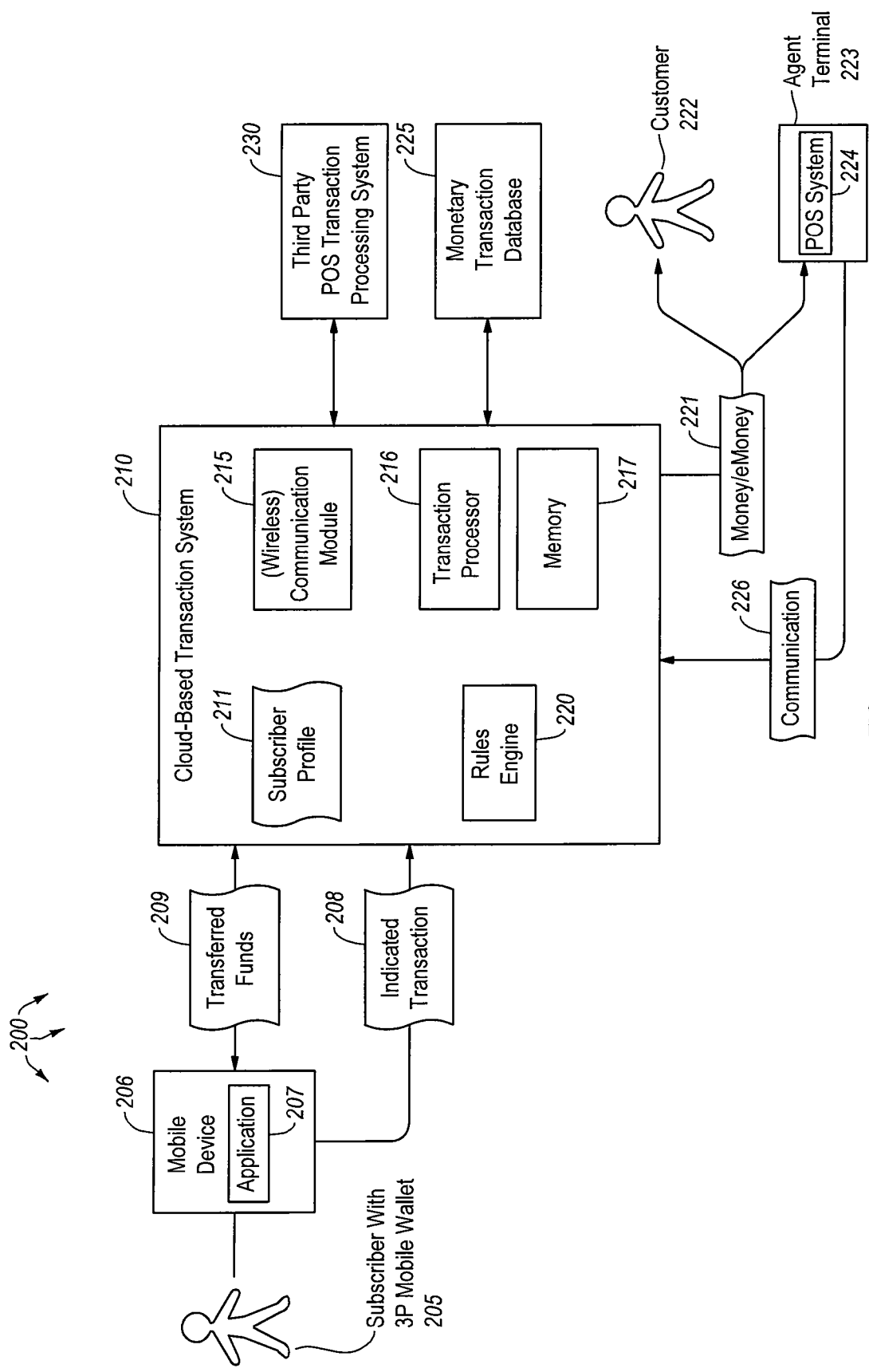
FIG. 2 illustrates an example embodiment of a cloud-based transaction platform.

FIG. 2 depicts a monetary transaction architecture 200 similar to that described in FIG. 1. The monetary transaction architecture 200 may provide a more simplified system structure in which each of the above services may be provided. The system includes a subscriber 205. The subscriber may have access to a bank account, or may be an unbanked subscriber. The subscriber has a profile 211 with the cloud-based transaction system 210. The profile includes the subscriber's know your customer (KYC) information, as well as any associated bank accounts, credit union accounts, bill pay accounts or other accounts. The subscriber has (or has access to) a mobile device 206 such as a phone or tablet. The mobile device runs the native or third party mobile wallet application 207.

The subscriber can indicate, using the mobile wallet application 207, which transaction or other action he or she would like to perform. The indicated transaction 208 is sent to the mobile wallet platform 210 to be carried out by the platform. The transaction processor 216 (which may be similar to or the same as transaction processor 121 of FIG. 1) performs the transaction(s) specified by the (unbanked) subscriber 205. The transaction processor may implement various other components to perform the transaction including memory 217, (wireless) communication module 215, rules engine 220 and/or a transaction database 225.

Performing the specified transactions may include communicating with the monetary transaction database 225 to determine whether the transaction is permissible based on data indicated in the unbanked subscriber's profile (for instance, whether the subscriber has enough eMoney 221 in his or her stored value account, or has enough money in his or her bank account). Rules engine 220 may also be consulted to determine whether the subscriber has exceeded a specified number of allowed transactions. Then, if funds are available, and the transaction is otherwise permissible, the monetary transaction system can transfer money or eMoney 221 to or from an entity such as a user or agent (e.g. customer 222) to or from an establishment such as an agent terminal (i.e. a retail store or agent company) 223.

In some cases, the cloud-based transaction system 210 provides a web interface that allows subscribers of third party mobile wallet applications to perform the same functions provided for native subscribers. For instance, mobile wallet application 207 may provide a web interface that allows a user to enroll for a native or third party mobile wallet. The web interface (or the mobile wallet application itself) receives a subscriber-initiated transaction over one of a plurality of communication channels (111 from FIG. 1) connected to the cloud-based transaction system 210. The web interface or mobile wallet application may prompt for and receive enrollment information (e.g. KYC information) for the (unbanked) subscriber 205 over at least one of the plurality of communication channels (e.g. web, point-of-sale (POS), interactive voice response (IVR, etc.). The web interface or mobile wallet application may then send activation instructions over the same or a different channel to activate the (unbanked) subscriber 205 and create a subscriber account for the (unbanked) subscriber.

Once the subscriber has an account, the cloud-based transaction system generates (or allows the third party provider to generate) a corresponding mobile wallet for the unbanked subscriber (available via the web interface and/or the mobile wallet application). The system then presents the (unbanked) subscriber's account data associated with the mobile wallet and/or a notification indicating that enrollment was successful to the subscriber. Accordingly, the mobile wallet application or the web interface may be used to provide user enrollment functionality. It should also be understood that either the mobile wallet application or the web interface may be used to provide substantially all of the third party or native mobile wallet functionality described herein.

It should also be noted that the mobile device 206 may be any type of plan-based phone or tablet, or prepaid phone or tablet. Many subscribers, such as unbanked subscribers, may primarily use prepaid phones. The mobile wallet application 207 may be installed on both plan-based phones and prepaid phones. The mobile wallet application may be installed on the device's SIM card, or on the device's main memory. Accordingly, the monetary transaction system 200 may be accessed and used via substantially any type of plan-based or prepaid mobile device.

Figure 4:
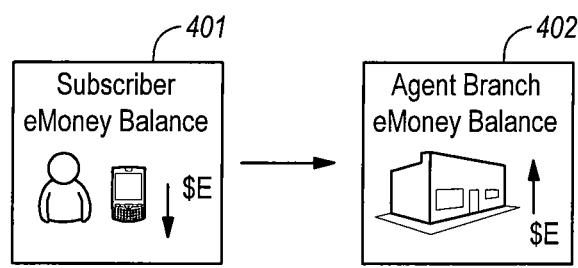
FIG. 4 illustrates an example data flow for making a retail purchase using a mobile wallet.

The components depicted in FIG. 1 can interoperate to provide a number of financial and other services including but not limited to enrolling a customer for a third party mobile wallet, adding a stored value account (either hosted by an electronic payment system or a third party), adding a bank/credit union account to a third party mobile wallet, adding a debit/credit card account to a third party mobile wallet, depositing funds in a third party mobile wallet, withdrawing funds from a third party mobile wallet, paying bills from a third party mobile wallet, topping up a prepaid mobile account through a third party mobile wallet, transferring funds through a third party mobile wallet, making in store purchases from a third party mobile wallet, or transferring money or eMoney from one business account to another business account (i.e. from one business's mobile vault to another business's mobile vault, as will be shown in FIG. 4).

Figure 3:
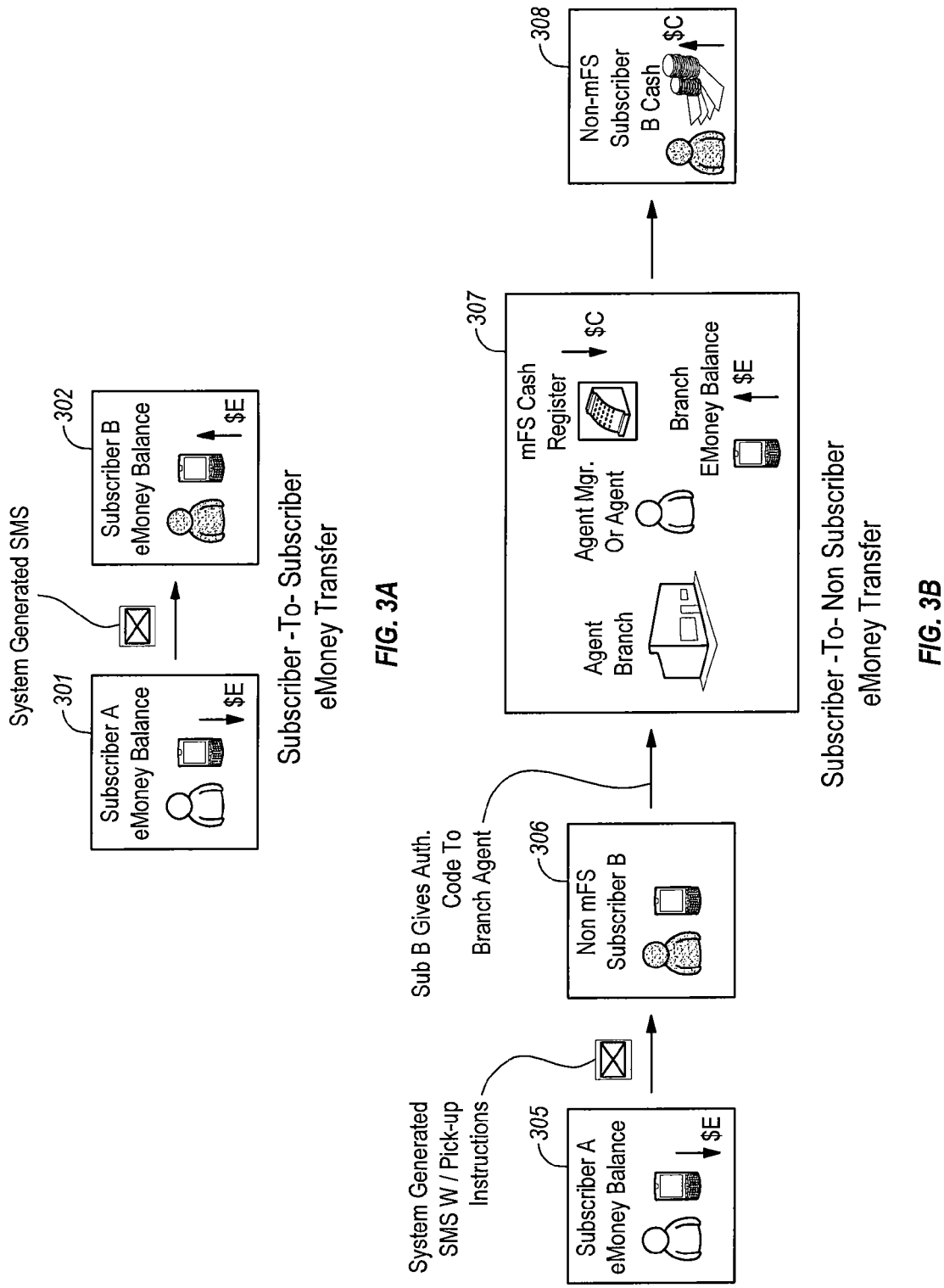
FIGS. 3A and 3B illustrate example data flows for performing subscriber-to-subscriber and subscriber-to-non-subscriber eMoney transfers via a mobile wallet, respectively.

FIG. 3A depicts a subscriber-to-subscriber eMoney transfer. In a merchant and distributor scenario, either or both of the merchant and the distributor (including any delivery personnel) may be subscribers. To perform such a transfer, subscriber A (301) enters some type of identification information identifying subscriber B (e.g. subscriber B's phone number) and an amount of money he or she wishes to transfer. The transaction processor 216 of the monetary transaction system 210 determines if there are sufficient funds to complete the transfer. If sufficient funds are available, the monetary transaction system 210 decrements subscriber A's account and credits subscriber B's account (302). The system then sends some kind of notification (e.g. SMS) to subscriber B indicating that a certain amount of money was transferred to their account. Subscriber A may also receive a notification that the transfer was successful. Accordingly, eMoney may be transferred between two cloud-based platform subscribers, one or both of which may be unbanked. The cloud-based transaction system 210 processes the subscribers' requests, updates the subscribers' eMoney balances, logs the transactions, and sends transaction information to a specified bank when needed.

FIG. 3B illustrates a subscriber-to-non-subscriber eMoney transfer. Accordingly, as mentioned above, either or both of the merchant and the distributor may be non-subscribers. In graphic 305, subscriber A wishes to send eMoney to another individual that is not a subscriber to the cloud-based transaction platform. The transaction is initiated in the same fashion as the subscriber-to-subscriber transfer scenario. However, since non-subscriber B does not have a mobile wallet account, the cloud-based transaction system 210 cannot credit them with eMoney. Instead, the cloud-based transaction system 210 sends a notification (e.g. via SMS) to non-subscriber B with instructions for how to pick-up the transferred money, along with an authorization code (306). The cloud-based transaction system 210 puts a hold on subscriber A's account for the amount transferred. Subscriber B then has a specified number of days to pick up the cash before the hold expires and the amount is credited back to subscriber A's eMoney account by the monetary transaction system 210.

When non-subscriber B goes to pick up the money at an agent branch, the agent branch's manager or agent verifies the authorization code via an agent manager or agent mobile wallet application (that, in turn, accesses the cloud-based transaction platform). Once the transfer has been validated, the agent gives the cash to non-subscriber B. The agent branch's mFS account is credited with the transfer amount (307) and the user leaves with the cash in hand (308). The cloud-based transaction platform processes the transfer request, updates subscriber A's eMoney balance, logs the transaction, and sends transaction details to a platform-specified bank.

FIG. 4 illustrates a mobile wallet subscriber making a retail purchase. Mobile wallet subscribers can make retail purchases at agent branches directly from their mobile device. Agent branches, as explained above, are retail stores or other entities that have registered with the cloud-based transaction platform and are able to accept native and third party mobile wallet payments. Accordingly, a subscriber can select the items they wish to purchase, and indicate (via the mobile wallet application) to the agent branch that they wish to pay for the items. The mobile wallet application then communicates with the agent branch and the monetary transaction system to indicate the price of the transaction. The monetary transaction system 210 then debits the subscriber's eMoney account (401) and credits the agent branch's eMoney account (402). The agent branch (and/or the agent manager or agent) receives confirmation that subscriber paid for the purchase. The subscriber may also receive a summary of the retail purchase and may be asked to confirm the purchase by entering a PIN. The monetary transaction system processes the purchase request, updates the agent branch and subscriber's eMoney balances, logs the transaction, and sends transaction details to a cloud-based transaction platform-specified bank.

In one embodiment, the cloud-based transaction system 210 is implemented to make a purchase from a mobile wallet. The communications module 215 of the monetary transaction system 210 receives a communication from a subscriber over a communication channel 111. The subscriber communication indicates that an unbanked subscriber 205 desires to purchase an item for a specified amount of funds using a specified payment method from the unbanked subscriber's native or third party mobile wallet.

The monetary transaction system 210 then returns a secure, perishable purchase code to the unbanked subscriber over at least one of the channels connected to the monetary transaction system and receives a subsequent agent branch communication over a channel indicating that the purchase code has been presented to an agent (branch). The monetary transaction system 210 validates the status of the specified payment method, determines if the specified payment method can accommodate a purchase for the specified amount, performs a limit check and/or a velocity check on the selected payment method, debits the specified payment method by the specified amount of funds, returns a notification to the agent branch authorizing the purchase and sends a receipt to the unbanked subscriber over a communication channel. The cloud-based transaction system 210 may thus be used in this manner to make a retail purchase using a native or third party mobile wallet.

Figure 5:
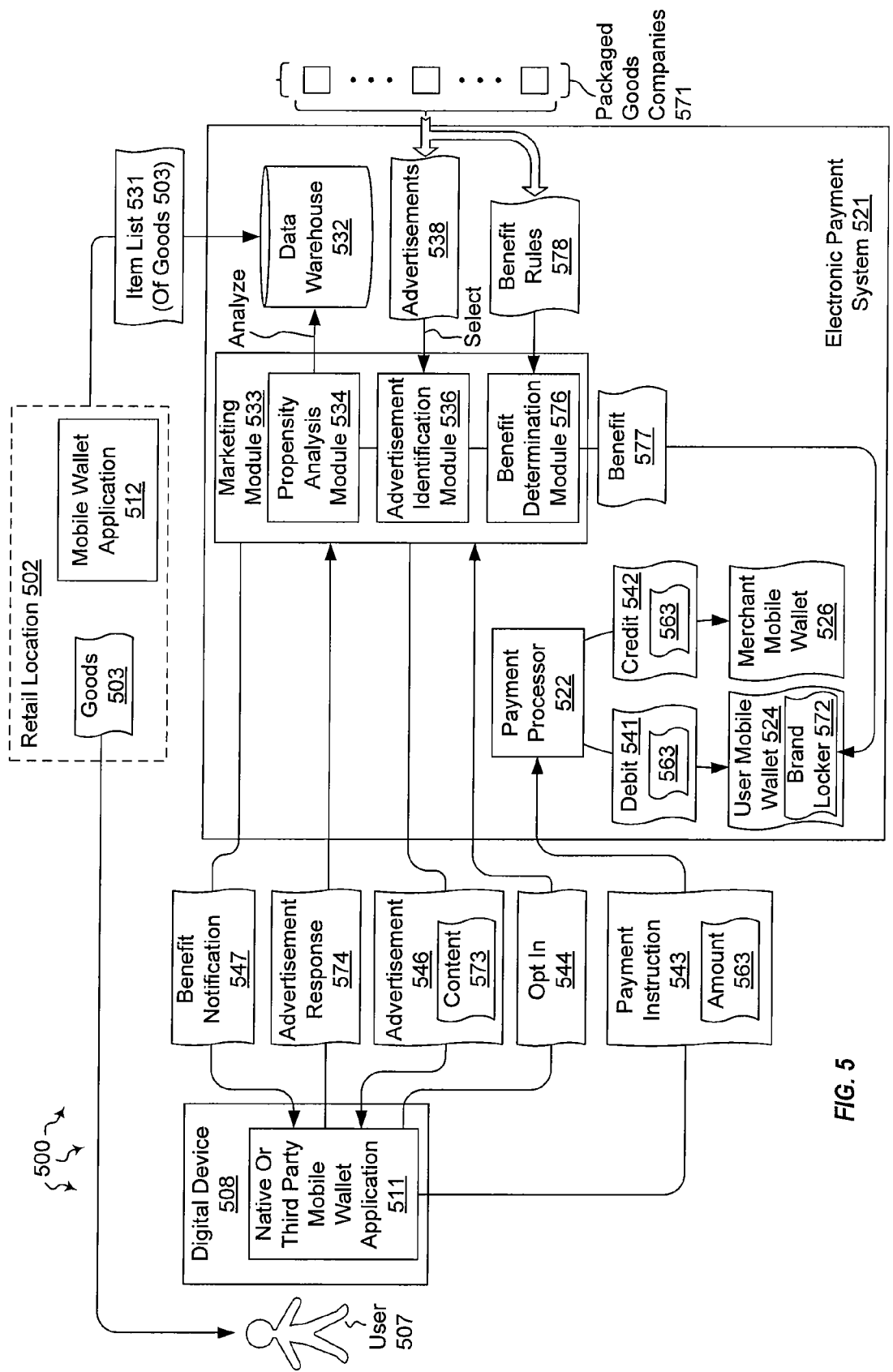
FIG. 5 illustrates an example embodiment of a monetary transaction system architecture.

FIG. 5 depicts a physical environment and corresponding computer system architecture 500 for allowing a user to participate in various services using a native or third party mobile wallet (e.g. 511). Some of these services include allowing the user 507 to access disruptively priced or free financial services or items in exchange for participation in opt-in advertising. The environment 500, like the scenarios described in FIGS. 3A, 3B and 4, involves the use of a native or third party mobile wallet application 511. The mobile wallet application 511 can be used to provide disruptively priced or free financial services or items in exchange for participation in opt-in advertising. The mobile wallet application may be run on any type of digital device including a mobile phone, tablet, laptop or other digital device. Embodiments include providing digital data (e.g., coupons or vouchers) for obtaining disruptively priced or free items (e.g., consumer goods or groceries) to such digital devices.

In some embodiments, a user has an account with a mobile payment system. The cloud-based transaction system (e.g. 210 of FIG. 2 or electronic payment system 521 of FIG. 5) can provide the user 507 with a variety of functionality including purchasing items (see FIG. 4), depositing funds, withdrawing funds, transferring funds (see FIGS. 3A and 3B), and others all from a third party wallet. Accordingly, the user can use a digital device to interact with the electronic payment system 521 to pay for goods and/or services.

In exchange for some type of financial benefit, the user opts in to receive advertisements. The financial benefits may include coupons, vouchers, promotions, Buy One Get One ("BOGO") offers or any other type of benefit (such as a reduced cost or free financial service or good) from the electronic payment system. The benefit may be targeted to the user based on the user's age, location or other demographic information, or based on the user's past purchases. At least in some embodiments, when the user agrees to participate in opt-in advertising, the electronic payment system 521 is permitted to store (e.g., by capturing purchase orders), track, and analyze items that the user purchases through their account with the electronic payment system. The electronic payment system stores and maintains lists of the users' purchased items in a data warehouse. The electronic payment system may also store information about the user (anonymous or otherwise) including age, income level, an indication of whether kids are in the family, or other information that may be useful in targeting ads or benefits to the user.

The electronic payment system analyzes 534 the users purchasing habits to identify advertisements and/or promotions that may be of interest to the user. The advertisements and/or promotions can be for items the user has purchased 503. The advertisements and/or promotions can also be for items related to items the user has purchase. For example, if user has purchased a particular brand of razor, advertisements for the brand's shaving cream can be identified. Advertisements for related items can also be used for cross-promotion.

From time to time, at specified intervals, or based on location (e.g., having a coupon for a merchant this is with a specified proximity) the electronic payment system sends identified advertisements and/or promotions to the user's digital device. When specified advertising thresholds are satisfied (e.g., a specified number and/or type of advertisements and/or promotions are presented), the electronic payment system confers a financial benefit on the user's account. For example, the electronic payment system can provide the user's account with a low cost (e.g., reduced fee) or free financial service, such as, for example, one reduced cost bill pay or one free bill pay. Alternately, the electronic payment system can provide the user's account with a coupon or voucher for an item (e.g., an item a user has pre-selected or an item the user has purchased in the past).

In some embodiments, a client application for the electronic payment system runs on the user's digital device (e.g. mobile wallet application 511). The user interacts with the electronic payment system through the client application. From a screen of the client application, the user can agree to accept opt in advertising. Accordingly, embodiments of the invention essentially permit a user to self-monetize themselves through their digital device.

As further depicted in FIG. 5, computer architecture 500 includes digital device 508, retail location 502, and electronic payment system 521. Digital device 508 further includes mobile wallet application 511. Retail location 502 further includes its own mobile wallet application 512. Electronic payment system 521 includes marketing module 533, data warehouse 532, advertisements 538, payment processor 522, user mobile wallet 524 (user 507's mobile wallet), and merchant mobile wallet 526 (retail location 502's mobile wallet).

Generally, each company in packaged goods companies 571 (or retailers that sell the packaged goods or other goods or services) can send advertisement data to electronic payment system 521. Advertisements 538 represent the collection of advertisement data sent from packaged goods companies 571. Each company in packaged goods companies 571 can also submit benefit rules to electronic payment system 521. Benefit rules 578 represent the collection of benefit rules sent from packaged goods companies 571. Benefit rules 578 define when a benefit, such as, for example, a free financial service, a coupon, a promotion, etc, is to be granted to a user of electronic payment system 521. For example, in response to completing a questionnaire linked to a product advertisement, a user can be given a coupon for the product or for a related product.

In general, user 507 can use native or third party mobile wallet application 511 to pay for goods purchased at retail location 502 (as shown in FIG. 4). For example, user 507 can use mobile wallet application 511 to purchase goods 503. To pay for goods 503, mobile wallet application 511 can send payment instruction 543 in amount 563 to electronic payment system 521. Payment processor 522 can receive payment instruction 543. In response, payment processor 522 can debit 541 user mobile wallet 524 by amount 563. Payment processor 522 can also credit 542 merchant mobile wallet 526 by amount 563.

User 507 can use mobile wallet application 511 to participate in opt-in advertising. For example, user 507 can use mobile wallet application 511 to send opt-in 544 to electronic payment system 521. Advertising module 536 can receive opt-in 544 and record that mobile wallet application 511 has opted in for advertising. As such, when user 507 makes a purchase using mobile wallet application 511, a list of purchased items is sent to electronic payment system 521. For example, upon purchasing goods 503, item list 531 is sent to electronic payment system 521 and stored in data warehouse 532.

Propensity analysis module 534 can analyze user 507's purchases, including item list 531. From the analysis, propensity analysis module 534 can identify items or categories of items user 507 may be interested in. The items can be items user 507 has purchased in the past (e.g., an item in goods 503) or items related to items user 507 has purchases in the past. Propensity analysis module 534 can indicate identified items or categories of items to advertisement identification module 536. These identified items or categories are items that the user is likely interested in and, as such, may have a propensity toward buying these items. The propensity analysis module may use past purchases, personal preferences, lifestyle or demographic information or other data in the propensity analysis.

Advertisement identification module 536 can then select advertisements from advertisements 538 that correspond to the identified items or categories of items. For example, advertisement identification module 536 can select advertisement 546 for presentation at mobile wallet application 511. Advertisement 546 can be an advertisement for a product made by a company in packaged goods companies 571. Additionally or alternatively, the advertisement 546 may be created by the merchant and may advertise products or services sold by that merchant.

Advertising module 533 can send selected advertisements to mobile wallet application 511. For example, advertising module 533 can send advertisement 546 (e.g., related to an item in goods 503) to mobile wallet application 511. In general, advertisements can include interactive content. For example, advertisement 546 includes content 573. Content 573 can be a video, a link to a company website (e.g., for a company in packaged goods companies 571), a call to action (such as a questionnaire), or some other content user 507 can interact with through digital device 508. User 507 can interact with content 573, for example, responding to questions in content 573. Advertisement response 574 can indicate how user 507 has interacted with content 573. In one embodiment, a call to action may be to post an update on Facebook® or some other website such as a retail establishment ranking website. If the user makes such a post or performs some other call to action, the user may be rewarded with a benefit. That benefit may be related to the product about which the user posted on the various websites.

Based on advertisement response 574, benefit determination module 576 can determine if a benefit is to be conferred upon user 507. Benefit determination module 576 can refer to benefit rules 578 when making a determination whether or not to confer a benefit. Thus, when user 507 interacts with advertisement 546 in a specified way (e.g., completes a survey, watches a video, etc.), benefit rules 578 can indicate that a company benefit (e.g., benefit 577) is to be conferred upon user 507. For example, benefit determination module 576 can confer benefit 577 on user 507. When user 507 receives an advertisement for a razor, for instance, and answers a questionnaire on how often they shave, a razor manufacture can give user 507 a coupon for reduced cost or free razor blades.

When a benefit is to be conferred on a user, the benefit can be stored in the user's brand locker. For example, benefit determination module 576 can store benefit 577 in brand locker 572 (part of user mobile wallet 524). Benefit 577 can be a coupon, a reduced cost or free financial service, a voucher, a promotion, a free bill pay, etc.

Benefit determination module 576 can also track aggregate statistics, such as, for example, specified number and/or type of advertisements received, for advertisements presented at native or third party mobile wallet application 511. Benefits can also be conferred upon users based on the aggregate statistics. For example, benefit determination module 576 can confer a benefit upon user 507 in response to twenty advertisements being presented at mobile wallet application 511. Thus, conferred benefits can be company-specified benefits or can be electronic payment system-specified benefits. Electronic payment system 521 can notify a user when a benefit is conferred. For example, electronic payment system 521 can send benefit notification 547 to mobile wallet application 511 to indicate benefit 577 being stored in brand locker 572.

When user 507 makes subsequent purchases through user mobile wallet 524, electronic payment system 521 can automatically check brand locker 572 for benefits related to any purchases items. If benefits for an item are identified, user 507 can be notified through mobile wallet application 511. In some cases, if benefits are identified, those benefits can be applied automatically when the user purchases that item or service. Thus, if the benefit is a coupon or a buy one get one free offer, that benefit may be applied automatically when the user uses his or her mobile wallet application 511 to purchase that item. Accordingly, embodiments of the invention permit user 507 to self monetize digital device 508 through agreeing to participate in opt-in advertising.

Although not depicted, various other modules from the architecture of FIG. 1 or 2 can also be included electronic payment system 521. The modules expressly depicted in FIG. 5 can interoperate with these other modules as appropriate to facilitate desired functionality.

Figure 6:
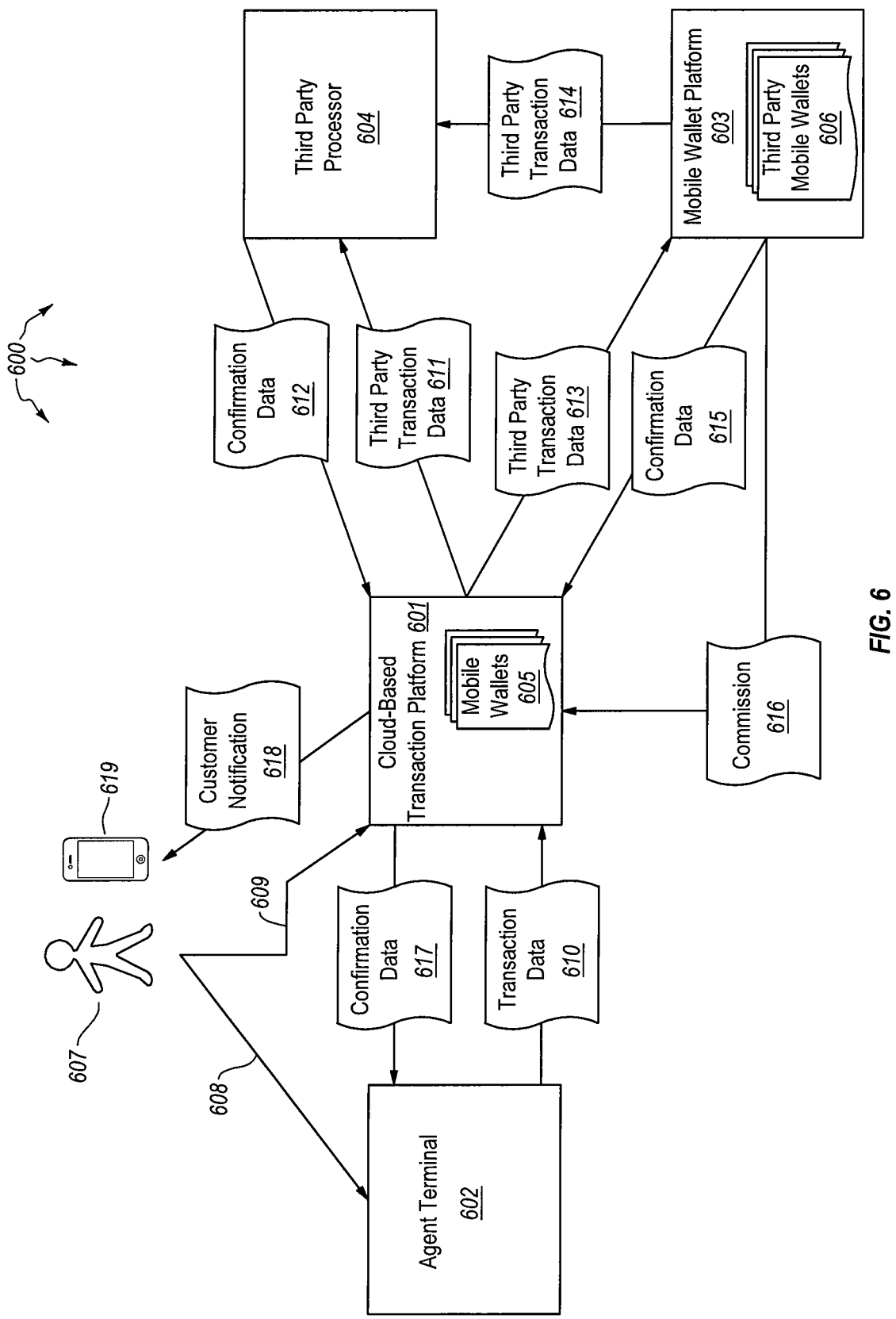
FIG. 6 illustrates an alternate example embodiment of a cloud-based transaction platform.
Figure 7:
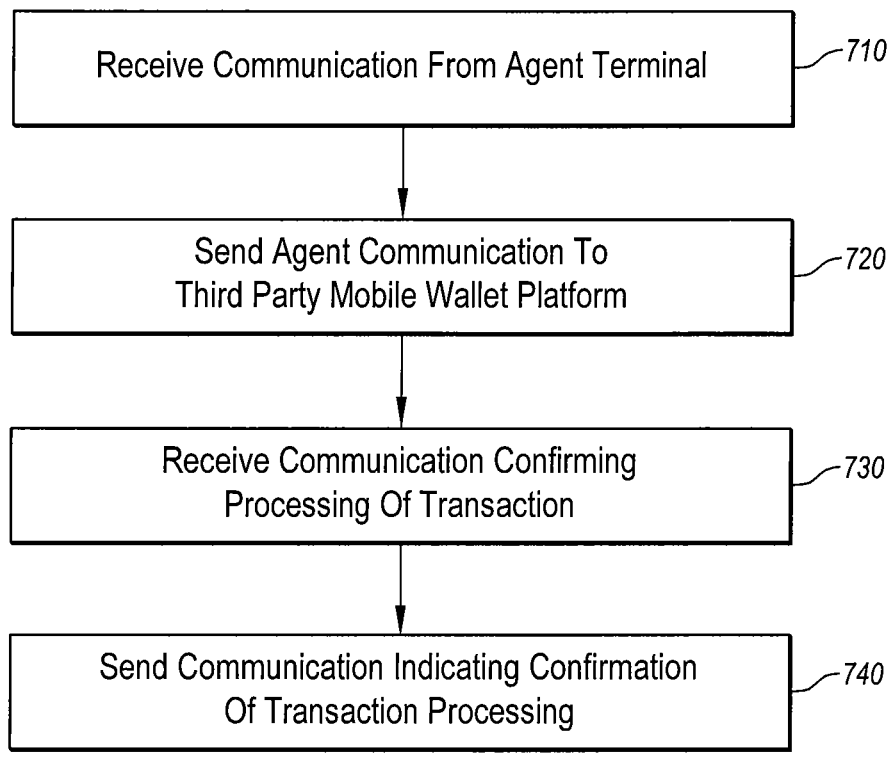
FIG. 7 illustrates an example embodiment data flow for performing a transaction using a third party mobile wallet.
Figure 8:
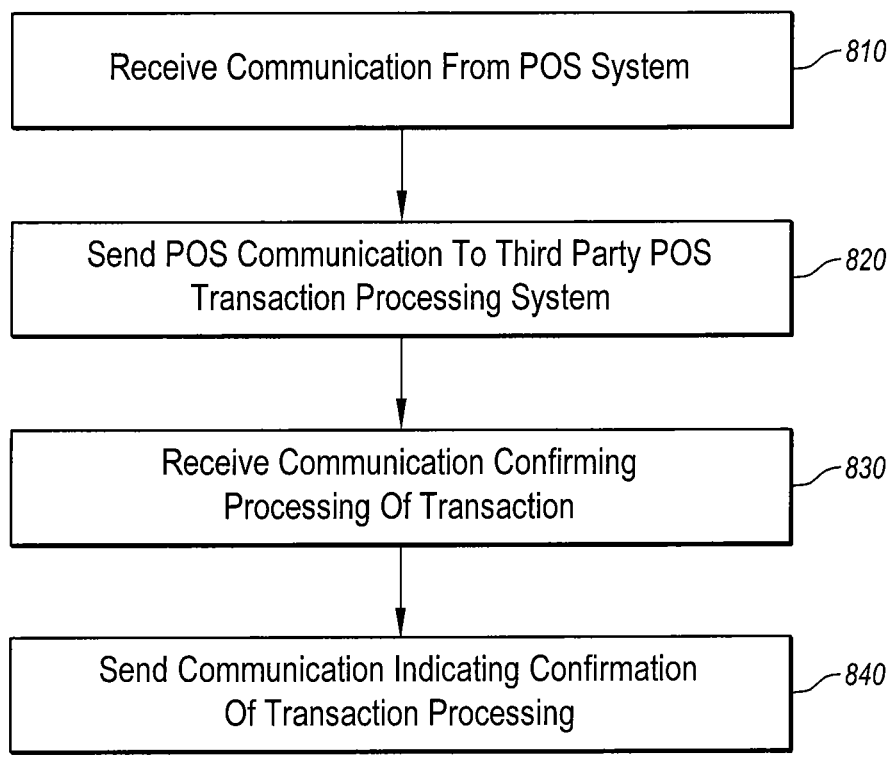
FIG. 8 illustrates an example embodiment data flow for performing a transaction using a third party point of sale (POS) system.
Figure 9:
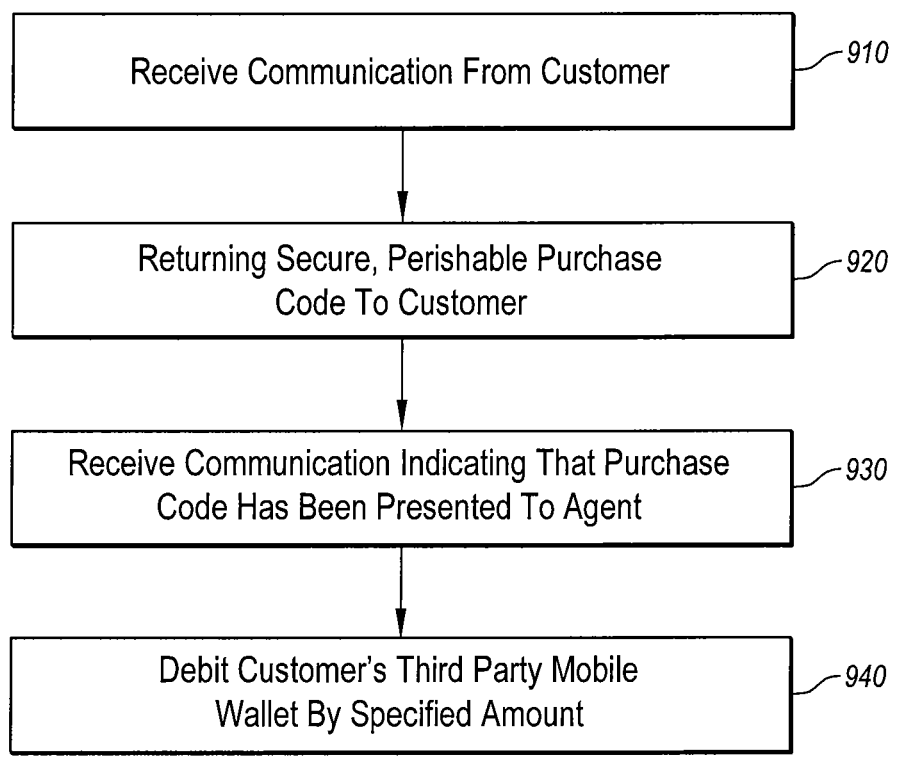
FIG. 9 illustrates an example embodiment data flow for making a purchase from a third party mobile wallet provided by a third party mobile wallet provider.

FIGS. 7-9 will now be described in conjunction with the computer architecture 600 illustrated in FIG. 6. FIG. 6 depicts a mobile wallet platform 601 that may have an architecture as shown in FIG. 1. As further depicted in FIG. 6, mobile wallet platform 601 communicates with an agent terminal 602 or a customer 607 to process transactions using a native or third party mobile wallet 605. Mobile wallet platform 601 may also communicate with a third party processor 604 to process transactions using a mobile wallet or third party mobile wallet. Mobile wallet platform 601 may also communicate with a third party mobile wallet platform 603 to process transactions using a mobile wallet owned or managed by a third party mobile wallet provider.

Mobile wallet platform 601 may also process the mobile wallet transaction or third party mobile wallet transaction internally, without the use of third party processors or third party mobile wallet platforms. In particular, mobile wallet platform 601 may process transactions using third party mobile wallets in the same or similar manner that transactions are processed as shown in FIGS. 2-5. Accordingly, the physical environment and corresponding computer system architecture 600 shown in FIG. 6 allows a cloud-based transaction platform 601 to support multiple third party mobile wallet providers.

Mobile wallet platform 601 communicates with agent terminal 602, third party mobile wallet platform 603, third party processor 604, and customer's mobile phone 619 through a variety of communication channels. For example, the communication between mobile wallet platform 601 and any one of these entities may be through communication channels 111, notification channels 112, or third party systems 113, as shown in FIG. 1. Communication between mobile wallet platform 601 and any one of these entities may also be through processor 121 shown in FIG. 1.

With respect to the entire description of FIG. 6, and as explained above, the term "mobile wallet" encompasses not only mobile wallets owned or managed by the mobile wallet platform, but also third party mobile wallets owned by third party mobile wallet providers or managed by third party mobile wallet platforms. In contrast, the term "third party mobile wallet" refers only to third party mobile wallets owned by third party mobile wallet providers or managed by third party mobile wallet platforms. Accordingly, cloud-based transaction platform 601 may manage and process transactions using mobile wallets 605, which may be mobile wallets owned by cloud-based transaction platform 601 or mobile wallets owned by a third party mobile wallet provider.

As shown in FIG. 6, customer 607 initiates a mobile wallet transaction 608 at agent terminal 602. Agent terminal 602 may be part of an agent network consisting of one or more agent terminals that communicate with cloud-based transaction platform 601. Examples of agent terminals are stores and other commercial establishments. Alternatively, customer 607 may initiate a mobile wallet transaction 609 by communicating with cloud-based transaction platform 601 through a channel selected by the customer.

Mobile wallet transactions 608 and 609 may be one or more of any type of transaction that can be performed using a mobile wallet, including but not limited to, a deposit, withdrawal, transfer, purchase, bill payment, topping up of a prepaid mobile account, or any other transaction described herein. Customer 607 may initiate transactions 608 and 609 in a variety of ways. For example, customer 607 can initiate a deposit into a mobile wallet, a withdrawal from a mobile wallet, a bill payment from a mobile wallet, topping up of a prepaid mobile account using a mobile wallet, a transfer from a mobile wallet, a remittance transaction, a selection of health care provider or payment of health services, a purchase of music, movies, games or other downloadable content, or other purchases using a mobile wallet.

After customer 607 initiates transaction 609 through agent terminal 602, agent terminal 602 then communicates with cloud-based transaction platform 601 by sending transaction data 610 to cloud-based transaction platform 601. Once cloud-based transaction platform 601 has received the transaction either through transaction data 610 from agent terminal 602 or from transaction 609 initiated by customer 607, cloud-based transaction platform 601 may then process the transaction in a variety of ways.

For example, cloud-based transaction platform 601 may process the transaction by communicating with third party processor 604 by sending third party transaction data 611, which may include some or all of the information in transaction data 610. Third party processor can then perform the requested transactional processing and respond by sending confirmation data 612 to cloud-based transaction platform 601. Confirmation data 612 can indicate whether the requested mobile wallet transaction was processed successfully or unsuccessfully.

In another example, cloud-based transaction platform 601 may process the transaction by communicating with third party mobile wallet platform 603 by sending third party transaction data 613, which may include some or all of the information in transaction data 610. Third party mobile wallet platform 603 may have any architecture which is suitable for processing mobile wallet transactions. Third party mobile wallet platform 603 may have an architecture that is the same or similar to the architecture shown in FIG. 1.

Alternatively, third party mobile wallet platform 603 may have a different architecture. In addition, any aspects of cloud-based transaction platform 601 or functionality provided by that platform may also be present in third party mobile wallet platform 603. After receiving third party transaction data 613, third party mobile wallet platform 603 may process the transaction itself or forward the transaction to third party processor 604 by sending third party transaction data 614.

Once processing of the transaction is complete, third party mobile wallet platform 603 may respond to cloud-based transaction platform 601 by sending confirmation data 615. Confirmation data 615 can indicate whether the requested mobile wallet transaction was processed successfully or unsuccessfully. In addition, following the processing performed by third party mobile wallet platform 603 after receiving third party transaction data 613, the third party mobile wallet platform 603 may provide a commission or transaction fee 616 to cloud-based transaction platform 601.

In a further example, mobile wallet platform 601 may process the transaction internally within cloud-based transaction platform 601. Specifically, cloud-based transaction platform 601 may process a transaction using a third party mobile wallet entirely within cloud-based transaction platform 601.

Once processing of the transaction is complete, cloud-based transaction platform 601 may communicate with agent terminal 602 by sending confirmation data 617 indicating information such as whether the transaction was successful or not. Also following processing of the transaction, mobile wallet platform may send customer notification 618 through an appropriate channel such as to the customer's mobile phone 619. For example, customer notification 618 may be sent using the notification services 102 and notification channels 112 (e.g. SMPP, SMTP, voice) of FIG. 1.

With reference now to FIGS. 2, 6 and 7, the cloud-based transaction system 210 receives communication 226 from an agent terminal 223 over a communication channel connected to the cloud-based transaction platform 210/601 (act 710). The agent communication indicates that a customer 222/205 desires to perform a mobile wallet transaction using their third party mobile wallet 207. The cloud-based transaction system 210 sends the agent communication to a third party mobile wallet platform 603 (act 720). The cloud-based transaction system 210 then receives communication 611 from the third party mobile wallet platform confirming processing of the transaction 612 (act 730) and sends communication 617 to the agent terminal 602 over communication channels 111 connected to the cloud-based transaction platform indicating confirmation of the processing of the transaction (act 740).

As mentioned above, multiple different types of transactions may be performed using the infrastructure provided by the cloud-based transaction system. The transactions may be a performed not only by a first customer that uses a first mobile wallet provider, but also by a second, different customer using a second, different third party mobile wallet provider. The third party mobile wallet platform may use a third party processor to perform (at least parts of) the transaction. The customer may be notified of confirmation of the processing of the transaction using the third party mobile wallet over various communication channels connected to the cloud-based transaction platform. In some cases, each third party mobile wallet provider has their own point of sale (POS) processing system 230. The third party mobile wallet providers' POS processing systems may communicate with each other using the cloud-based transaction platform to process the transaction.

One of the transactions made possible by the cloud-based transaction platform 601 is depositing funds into a third party mobile wallet owned by an entity different than the customer. The cloud-based transaction system may receive a communication 226 from the agent terminal 223 over a communication channel connected to the cloud-based transaction platform. The agent communication indicates that the customer desires to deposit a specified amount of funds into their third party mobile wallet 605. The cloud-based transaction system may then credit the third party mobile wallet with the specified amount of funds.

Another transaction provided by the cloud-based transaction platform 601 is withdrawing funds from a third party mobile wallet owned by an entity different than the customer. The cloud-based transaction platform receives communication 208 from the customer 205 indicating that the customer desires to withdraw a specified amount of funds from the third party mobile wallet. The cloud-based transaction platform 601 returns a secure, perishable withdrawal code to the customer over at least one of the communication channels connected to the cloud-based transaction platform. It also receives communication from the agent terminal 223 indicating that the withdrawal code has been presented to an agent and debits the third party mobile wallet by the specified amount of funds.

Another transaction provided by the cloud-based transaction platform 601 is transferring money from a third party mobile wallet within the cloud-based transaction platform to a recipient at a second third party mobile wallet provided by a second mobile wallet provider. In this transaction, the platform 601 receives a customer communication 208 indicating that a customer 205 desires to transfer a specified amount of funds to a specified recipient using a specified payment method from the third party mobile wallet 606. The cloud-based transaction platform debits the third party mobile wallet by the specified amount of funds and transfers the specified amount of funds from the cloud-based transaction platform to the second different third party mobile wallet platform for delivery to the specified recipient. The specified amount of funds is then transferred to the second third party mobile wallet platform.

Yet another transaction provided by the cloud-based transaction platform 601 is making a purchase from a third party mobile wallet managed by a third party mobile wallet platform. In this transaction, the cloud-based transaction platform receives communication 208 from the customer 205 indicating that the customer desires to purchase an item for a specified amount of funds using a specified payment method from the customer's third party mobile wallet 606. The cloud-based transaction platform returns a secure, perishable purchase code to the customer, receives communication 226 from the agent terminal 223 indicating that the purchase code has been presented to an agent, and debits the customer's third party mobile wallet by the specified amount of funds.

In another embodiment, as shown in FIG. 8, a cloud-based transaction system performs or facilitates a transaction using a third party point of sale (POS) system. The cloud-based transaction system receives communication 226 from a specified POS system 224 implemented at an agent terminal 223 over a communication channels 111 connected to the cloud-based transaction platform 210 (act 810). The POS communication indicates that a customer 205 has initiated a mobile wallet transaction using their third party mobile wallet 207. The cloud-based transaction system sends the POS communication to a corresponding third party POS transaction processing system 230 that has been established to process POS transactions from the specified POS system (act 820). The cloud-based transaction system then receives communication from the third party POS transaction processing system 230 confirming processing of the transaction (act 830) and sends communication to the specified POS system 224 implemented at the agent terminal 223 indicating confirmation of the processing of the transaction (act 840).

In some cases, transaction fees or commissions 616 may be paid by the third party mobile wallet platform to the cloud-based transaction platform for facilitating the transaction. One of the transactions allowed by the cloud-based transaction system is depositing funds into a third party mobile wallet provided by a third party mobile wallet provider. In this transaction, the cloud-based transaction platform 210 receives communication 226 from a specified POS system 224 implemented at the agent terminal 223 over a communication channels 111 connected to the cloud-based transaction platform. The POS communication indicates that the customer 205/222 desires to deposit a specified amount of funds into the third party mobile wallet 606 provided by the third party mobile wallet provider. The cloud-based transaction system validates the status of the third party mobile wallet provided by the third party mobile wallet provider, determines if the specified POS system implemented at the agent terminal is authorized to deposit money, performs a limit check or a velocity check on the third party mobile wallet provided by the third party mobile wallet provider, credits the third party mobile wallet provided by the third party mobile wallet provider with the specified amount of funds, returns a notification to the specified POS system implemented at the agent terminal confirming the deposit and notifies the customer that the specified amount of funds were deposited in the third party mobile wallet provided by the third party mobile wallet provider over a communication channel connected to the cloud-based transaction platform 210.

Another transaction provided by the cloud-based transaction platform 210 is withdrawing funds from a third party mobile wallet provided by a third party mobile wallet provider. The cloud-based transaction platform 210 receives communication 208 from a customer 205 indicating that the customer desires to withdraw a specified amount of funds from the third party mobile wallet 606 provided by the third party mobile wallet provider. The cloud-based transaction platform 210 validates the status of the third party mobile wallet provided by the third party mobile wallet provider, determines if the balance of the third party mobile wallet provided by the third party mobile wallet provider is sufficient to accommodate the requested withdrawal for the specified amount of funds, performs a limit check and/or a velocity check on the third party mobile wallet, returns a secure, perishable withdrawal code to the customer over a communication channel 111 connected to the cloud-based transaction platform, receives subsequent POS communication 226 indicating that the withdrawal code has been presented to an agent (e.g. at agent terminal 223), debits the third party mobile wallet provided by the third party mobile wallet provider by the specified amount of funds, returns a notification to the POS system at the agent terminal confirming the withdrawal and notifies the customer 205 (e.g. in confirmation 617) that the specified amount of funds were withdrawn from the third party mobile wallet.

In yet another transaction provided by the cloud-based transaction platform, money is transferred using a third party mobile wallet provided by a third party mobile wallet provider. The cloud-based transaction platform 210 receives customer communication 208 indicating that the customer 205 desires to transfer a specified amount of funds to a specified recipient having a third party mobile wallet 606, where the transfer uses a specified payment method from the customer's third party mobile wallet at the cloud-based transaction platform 210. The cloud-based transaction platform validates the status of the specified payment method, performs a limit check and/or a velocity check on the specified payment method, performs a check on the specified recipient having a third party mobile wallet to comply with the office of foreign assets control, debits the customer's mobile wallet at the cloud-based transaction platform by the specified amount of funds, transfers the specified amount of funds to third party mobile wallet provider for delivery to the third party mobile wallet of the specified recipient over a communication channel connected between the cloud-based transaction platform and the third party mobile wallet provider, and notifies the customer that the specified amount of funds was transferred to the specified recipient.

In another transaction provided by the cloud-based transaction platform 210, a purchase is made from a third party mobile wallet provided by a third party mobile wallet provider. In this transaction, the cloud-based transaction system receives communication 208 from the customer 205 indicating that the customer desires to purchase an item for a specified amount of funds using a specified payment method from the customer's third party mobile wallet 606. The cloud-based transaction system returns a secure, perishable purchase code to the customer, receives subsequent agent terminal communication indicating that the purchase code has been presented to an agent, validates the status of the specified payment method, determines if the specified payment method can accommodate a purchase for the specified amount, performs a limit check and/or a velocity check on the specified payment method, debits the customer's third party mobile wallet by the specified amount of funds by sending communication to the third party mobile wallet provider, returns a notification to the POS system at the agent terminal authorizing the purchase and sends a receipt to the customer over at least one of the plurality of communication channels connected to the cloud-based transaction platform.

FIG. 9 describes a further embodiment in which a cloud-based transaction platform facilitates making a purchase from a third party mobile wallet provided by a third party mobile wallet provider. The cloud-based transaction system 210 receives communication 208 from a customer 205 over a communication channel connected to the cloud-based transaction platform (act 910). The customer communication indicating that a customer desires to purchase an item for a specified amount of funds using a specified payment method indicated by the customer's third party mobile wallet 606. The cloud-based transaction system returns a secure, perishable purchase code to the customer (act 920) and receives communication from an agent terminal 223 over at least one of the communication channels connected to the cloud-based transaction platform indicating that the purchase code has been presented to an agent (act 930). The cloud-based transaction system 210 then debits the customer's third party mobile wallet 606 by the specified amount of funds (act 940).

Substantially any item may be purchased using this transaction technique including items provided directly by the cloud-based transaction system, or items provided by third party retailers through the cloud-based transaction system. These items may include health care services, physical, shippable items, music, games, movies or any other digital or downloadable content.

Embodiments of the invention can adhere to Know Your Customer (KYC) rules in the United States by performing Customer Identification Program (CIP) checks as required by the Bank Secrecy Act and U.S. PATRIOT Act. A minimum amount of information can be gathered about a customer, such as, for example, First Name, Last Name, Date of Birth, Government ID Type, Government ID Number, Address. The CIP processes are designed to validate customer identity against government blacklists and assist in the prevention of money laundering and terrorist financing. A combination of non-documentary and documentary verification can be used to ensure beyond a reasonable doubt the identity of the customer.

Non-Documentary Verification can occur through the presentment of the information that was collected from the user to an external third party, such as, for example, Lexis Nexis. Documentary Verification can occur if non-documentary verification fails, then the user is asked to present an unexpired government ID. Various differ forms of identification including Driver's license, Passport, Alien identification (e.g., green card or work visa), and Mexican Consular identification card, can be accepted.

Embodiments of the invention can perform Anti-Money Laundering (AML) and Combating the Financing of Terrorism (CFT) checks. AML and CFT checks can be performed using transaction monitoring methods to flag names and suspicious transactions for further investigation. The mobile wallet platform can perform AML and CFT checks on all electronic financial transactions to ensure that electronic funds are not being used for money laundering or terrorism. Transaction limits can be placed on user accounts. The transaction limits are fully configurable for each particular use case, channel and payment method that allows maximum flexibility to restrict higher risk use cases. Velocity checks can also be performed. Velocity Checks ensure that subscribers are not abusing the mobile wallet platform within the allowable limits.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing system for facilitating management of a mobile wallet, including:
   one or more processors;
   system memory;
   an integration tier configured to manage mobile wallet sessions with a mobile device and including web services communication mechanisms for interfacing with a mobile wallet application installed on a hardware SIM card as well as with a plurality of different device types over a plurality of different communication channels, the integration tier being configured to receive binary and text messages from the mobile device;
   a notification services engine configured to interface with the integration tier and to send Short Message Peer-to-Peer (SSMP) messages, Short Messaging Service (SMS) messages and Simple Mail Transfer Protocol (SMTP) messages over the different communication channels to different devices, including the mobile device, to interface with the mobile wallet application installed on the hardware SIM card;
   service connectors that are each configured to connect the computing system to a different third party system, each of the service connectors being configured as a separate module for integrating a corresponding external service to the computing system;
   a payment handler that exposes a common API for interacting with different payment processors;
   a security services engine that performs subscriber authentication utilizing a database-based Access Control List (ACL);
   a rules engine configured to enforce constraints on financial transactions performed with the mobile wallet application, the mobile wallet application being associated with a mobile wallet account; and
   one or more computer-readable storage media having stored thereon computer-executable instructions that are executable by the one or more processors to cause the computing system to perform a transaction for a customer using the mobile wallet which is owned by another entity than the customer, comprising the following:
      the computing system receiving communication from an agent terminal over one of a plurality of communication channels connected to the cloud-based transaction platform, the agent communication indicating that a customer desires to perform a transaction comprising a mobile wallet transaction using a third party mobile wallet, the mobile wallet transaction comprising at least one of a mobile wallet transfer in which funds are transferred from the mobile wallet of the customer to a third party mobile wallet, a mobile wallet withdrawal in which funds are withdrawn from the third party mobile wallet and provided to the customer, or a mobile wallet deposit in which funds are deposited into the third party mobile wallet;
      the computing system sending the agent communication to the third party mobile wallet platform;
      the computing system determining whether the mobile wallet transaction comprises the mobile wallet withdrawal and when the mobile wallet transaction is determined to comprise the mobile wallet withdrawal, generating and providing a perishable withdrawal code to the consumer, which is presented to the agent terminal to facilitate processing of the mobile wallet withdrawal;
      the computing system receiving communication from the third party mobile wallet platform confirming processing of the transaction, the transaction comprising at least one of the mobile wallet transfer, the mobile wallet withdrawal or the mobile wallet deposit; and
      the computing system sending communication to the agent terminal over one of a plurality of communication channels connected to the cloud-based transaction platform, the communication indicating confirmation of the processing of the transaction.

2. The computing system of claim 1, wherein a new transaction is performed by the computing system for a second, different customer using a second, different third party mobile wallet.

3. The computing system of claim 1, wherein the transaction further comprises the customer of confirmation of the processing of the transaction using the third party mobile wallet over at least one of the plurality of communication channels connected to the cloud-based transaction platform.

4. The computing system of claim 1, wherein the third party mobile wallet is provided by a third party mobile wallet provider.

5. The computing system of claim 4, wherein each third party mobile wallet provider has their own point of sale (POS) processing system.

6. The computing system of claim 5, wherein the third party mobile wallet providers' POS processing systems communicate with each other using the cloud-based transaction platform to process the transaction.

7. computing system of claim 1, wherein the transaction comprises the mobile wallet deposit for depositing funds into the third party mobile wallet which is owned by the entity different than the customer, including:
   receiving communication from the agent terminal over one of the plurality of communication channels connected to the cloud-based transaction platform, the agent communication indicating that the customer desires to deposit a specified amount of funds into the third party mobile wallet; and
   crediting the third party mobile wallet with the specified amount of funds.

8. The computing system of claim 1, wherein the transaction comprises the mobile wallet withdrawal for withdrawing funds from the third party mobile wallet owned which is owned by the entity different than the customer, including:

receiving communication from the customer over one of the plurality of communication channels connected to the cloud-based transaction platform, the customer communication indicating that the customer desires to withdraw a specified amount of funds from the third party mobile wallet;

providing the perishable withdrawal code to the customer over at least one of the plurality of communication channels connected to the cloud-based transaction platform;

receiving communication from the agent terminal over at least one of the plurality of communication channels connected to the cloud-based transaction platform, the agent terminal communication indicating that the perishable withdrawal code has been presented to an agent; and debiting the third party mobile wallet by the specified amount of funds.

9. The computing system of claim 1, wherein the transaction comprises the mobile wallet transfer for transferring money from a mobile wallet account of the customer provided by a first mobile wallet provider to a third party mobile wallet of a recipient provided by a second mobile wallet provider, the method comprising:

receiving customer communication over one of the plurality of communication channels connected to the cloud-based transaction platform, the customer communication indicating that the customer desires to transfer a specified amount of funds to the recipient using a specified payment method from the mobile wallet account of the customer;

debiting the mobile wallet account by the specified amount of funds; and transferring the specified amount of funds from the cloud-based transaction platform to the second third party mobile wallet platform for delivery to the specified recipient, the specified amount of funds being transferred over at least one of the plurality of channels connected to the third party mobile wallet platform.

10. The computing system of claim 1, wherein the claimed method also includes performing a new transaction comprising a mobile wallet purchase at an agent terminal using a third party mobile wallet managed by a third party mobile wallet platform, including:

receiving communication from the customer over one of the plurality of channels connected to the cloud-based transaction platform, the customer communication indicating that the customer desires to purchase an item for a specified amount of funds using a specified payment method from a third party mobile wallet;

returning a secure, perishable purchase code to the customer over at least one of the plurality of channels connected to the cloud-based transaction platform;

receiving communication from the agent terminal over at least one of the plurality of channels connected to the cloud-based transaction platform, the agent terminal communication indicating that the purchase code has been presented to an agent;

debiting the third party mobile wallet by the specified amount of funds; and crediting an agent account by the specified amount of funds.

11. At a computer system including at least one processor and a memory, a computer-implemented a method for performing a transaction for a customer using a third party mobile wallet owned by another entity than the customer, the method comprising the following:

the computing system receiving communication from an agent terminal over one of a plurality of communication channels connected to the cloud-based transaction platform, the agent communication indicating that a customer desires to perform a transaction comprising a mobile wallet transaction using a third party mobile wallet, the mobile wallet transaction comprising at least one of a mobile wallet transfer in which funds are transferred from the mobile wallet of the customer to a third party mobile wallet, a mobile wallet withdrawal in which funds are withdrawn from the third party mobile wallet and provided to the customer, or a mobile wallet deposit in which funds are deposited into the third party mobile wallet;

the computing system sending the agent communication to the third party mobile wallet platform;

the computing system receiving communication from the third party mobile wallet platform confirming processing of the transaction, the transaction comprising at least one of the mobile wallet transfer, the mobile wallet withdrawal or the mobile wallet deposit;

the computing system determining whether the mobile wallet transaction comprises the mobile wallet withdrawal and when the mobile wallet transaction is determined to comprise the mobile wallet withdrawal, generating and providing a perishable withdrawal code to the consumer, which is presented to the agent terminal to facilitate processing of the mobile wallet withdrawal; and the computing system sending communication to the agent terminal over one of a plurality of communication channels connected to the cloud-based transaction platform, the communication indicating confirmation of the processing of the transaction, wherein the computing system includes:

one or more processors;

system memory;

an integration tier configured to manage mobile wallet sessions with a mobile device on which a mobile wallet application is installed and including web services communication mechanisms for interfacing with the mobile wallet application which is installed on a hardware SIM card as well as with a plurality of different device types over a plurality of different communication channels, the integration tier being configured to receive binary and text messages from the mobile device;

a notification services engine configured to interface with the integration tier and to send Short Message Peer-to-Peer (SSMP) messages, Short Messaging Service (SMS) messages and Simple Mail Transfer Protocol (SMTP) messages over the different communication channels to different devices, including the mobile device, to interface with the mobile wallet application installed on the hardware SIM card;

service connectors that are each configured to connect the computing system to a different third party system, each of the service connectors being configured as a separate module for integrating a corresponding external service to the computing system;

a payment handler that exposes a common API for interacting with different payment processors;

a security services engine that performs subscriber authentication utilizing a database-based Access Control List (ACL); and a rules engine configured to enforce constraints on financial transactions performed with the mobile wallet application.

12. The computer-implemented method of claim 11, wherein a new transaction is performed by the computing system for a second, different customer using a second, different third party mobile wallet.

13. The computer-implemented method of claim 11, wherein the third party mobile wallet platform comprises a third party processor.

14. The computer-implemented method of claim 11, further comprising notifying the customer of confirmation of the processing of the transaction using the third party mobile wallet over at least one of the plurality of communication channels connected to the cloud-based transaction platform.

15. The computer-implemented method of claim 11, wherein the third party mobile wallet is provided by a third party mobile wallet provider.

16. The computer-implemented method of claim 15, wherein each third party mobile wallet provider has their own point of sale (POS) processing system.

17. The computer-implemented method of claim 16, wherein the third party mobile wallet providers' POS processing systems communicate with each other using the cloud-based transaction platform to process the transaction.

18. The computer-implemented method of claim 11, wherein the transaction comprises the mobile wallet deposit for depositing funds into the third party mobile wallet which is owned by the entity different than the customer, including:
    receiving communication from the agent terminal over one of the plurality of communication channels connected to the cloud-based transaction platform, the agent communication indicating that the customer desires to deposit a specified amount of funds into the third party mobile wallet; and
    crediting the third party mobile wallet with the specified amount of funds.

19. The computer-implemented method of claim 11, wherein the transaction comprises the mobile wallet withdrawal for withdrawing funds from the third party mobile wallet owned which is owned by the entity different than the customer, including:
    receiving communication from the customer over one of the plurality of communication channels connected to the cloud-based transaction platform, the customer communication indicating that the customer desires to withdraw a specified amount of funds from the third party mobile wallet;
    returning providing the perishable withdrawal code to the customer over at least one of the plurality of communication channels connected to the cloud-based transaction platform;
    receiving communication from the agent terminal over at least one of the plurality of communication channels connected to the cloud-based transaction platform, the agent terminal communication indicating that the perishable withdrawal code has been presented to an agent;
    debiting the third party mobile wallet by the specified amount of funds; and
    crediting the agents account by the specified amount of funds.

20. The computer-implemented method of claim 11, wherein the transaction comprises the mobile wallet transfer for transferring money from a mobile wallet account of the customer provided by a first mobile wallet provider to a third party mobile wallet of a recipient provided by a second mobile wallet provider, the method comprising:
    receiving customer communication over one of the plurality of communication channels connected to the cloud-based transaction platform, the customer communication indicating that the customer desires to transfer a specified amount of funds to the recipient using a specified payment method from the mobile wallet account of the customer;
    debiting the mobile wallet account by the specified amount of funds; and
    transferring the specified amount of funds from the cloud-based transaction platform to the second third party mobile wallet platform for delivery to the specified recipient, the specified amount of funds being transferred over at least one of the plurality of channels connected to the third party mobile wallet platform.

21. The computer-implemented method of claim 11, wherein the claimed method also includes performing a new transaction comprising a mobile wallet purchase at an agent terminal using a third party mobile wallet managed by a third party mobile wallet platform, including:
    receiving communication from the customer over one of the plurality of channels connected to the cloud-based transaction platform, the customer communication indicating that the customer desires to purchase an item for a specified amount of funds using a specified payment method from a third party mobile wallet;
    returning a secure, perishable purchase code to the customer over at least one of the plurality of channels connected to the cloud-based transaction platform;
    receiving communication from the agent terminal over at least one of the plurality of channels connected to the cloud-based transaction platform, the agent terminal communication indicating that the purchase code has been presented to an agent;
    debiting the third party mobile wallet by the specified amount of funds; and
    crediting an agent account by the specified amount of funds.

22. One or more computer-readable hardware storage devices having stored thereon computer-executable instructions that are executable by the one or more processors of a computing system to cause the computing system to perform a transaction for a customer using a third party mobile wallet owned by another entity than the customer, comprising the following:
    the computing system receiving communication from an agent terminal over one of a plurality of communication channels connected to the cloud-based transaction platform, the agent communication indicating that a customer desires to perform a transaction comprising a mobile wallet transaction using a third party mobile wallet, the mobile wallet transaction comprising at least one of a mobile wallet transfer in which funds are transferred from the mobile wallet of the customer to a third party mobile wallet, a mobile wallet withdrawal in which funds are withdrawn from the third party mobile wallet and provided to the customer, or a mobile wallet deposit in which funds are deposited into the third party mobile wallet;
    the computing system sending the agent communication to the third party mobile wallet platform;
    the computing system receiving communication from the third party mobile wallet platform confirming processing of the transaction, the transaction comprising at least one of the mobile wallet transfer, the mobile wallet withdrawal or the mobile wallet deposit;
    the computing system determining whether the mobile wallet transaction comprises the mobile wallet withdrawal and when the mobile wallet transaction is determined to comprise the mobile wallet withdrawal, generating and providing a perishable withdrawal code to the consumer, which is presented to the agent terminal to facilitate processing of the mobile wallet withdrawal; and the computing system sending communication to the agent terminal over one of a plurality of communication channels connected to the cloud-based transaction platform, the communication indicating confirmation of the processing of the transaction, wherein the computing system includes:

one or more processors;

system memory;

an integration tier configured to manage mobile wallet sessions with a mobile device on which a mobile wallet application is installed and including web services communication mechanisms for interfacing with the mobile wallet application which is installed on a hardware SIM card as well as with a plurality of different device types over a plurality of different communication channels, the integration tier being configured to receive binary and text messages from the mobile device;

a notification services engine configured to interface with the integration tier and to send Short Message Peer-to-Peer (SSMP) messages, Short Messaging Service (SMS) messages and Simple Mail Transfer Protocol (SMTP) messages over the different communication channels to different devices, including the mobile device, to interface with the mobile wallet application installed on the hardware SIM card;

service connectors that are each configured to connect the computing system to a different third party system, each of the service connectors being configured as a separate module for integrating a corresponding external service to the computing system;

a payment handler that exposes a common API for interacting with different payment processors;

a security services engine that performs subscriber authentication utilizing a database-based Access Control List (ACL); and a rules engine configured to enforce constraints on financial transactions performed with the mobile wallet application.

* * * * *